US012681122B2

(12) United States Patent
Jiang

(10) Patent No.: US 12,681,122 B2
(45) Date of Patent: Jul. 14, 2026

(54) METHOD AND APPARATUS FOR ACQUIRING ANGLE OF DEPARTURE (AOD) OF TERMINAL, AND COMMUNICATION DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 440 days.

(21) Appl. No.: 18/036,754

(22) PCT Filed: Nov. 13, 2020

(86) PCT No.: PCT/CN2020/128837
§ 371 (c)(1),
(2) Date: May 12, 2023

(87) PCT Pub. No.: WO2022/099657
PCT Pub. Date: May 19, 2022

(65) Prior Publication Data
US 2023/0408620 A1      Dec. 21, 2023

(51) Int. Cl.
*G01S 3/48* (2006.01)

(52) U.S. Cl.
CPC ..................................... *G01S 3/48* (2013.01)

(58) Field of Classification Search
CPC ..... G01S 3/48; G01S 1/08; G01S 5/06; G01S 3/00; G01S 5/02; H04B 7/086
USPC ........................................................ 370/203
See application file for complete search history.

(56) References Cited

U.S. PATENT DOCUMENTS

| 2015/0003338 | A1* | 1/2015 | Xue | ...................... H04W 76/30 |
| | | | | 370/329 |
| 2017/0131380 | A1 | 5/2017 | Malik et al. | |
| 2019/0086505 | A1* | 3/2019 | Malik | ...................... G01S 5/08 |
| 2020/0229124 | A1 | 7/2020 | Soriaga et al. | |
| 2022/0053351 | A1* | 2/2022 | Chen | ................... H04W 64/003 |
| 2022/0099784 | A1* | 3/2022 | Ranjbar | .................... G01S 3/38 |

(Continued)

FOREIGN PATENT DOCUMENTS

| CN | 101437286 A | 5/2009 |
| CN | 102958096 A | 3/2013 |
| CN | 108226862 A | 6/2018 |

(Continued)

OTHER PUBLICATIONS

Intel Corporation. "Potential RAT Dependent Techniques for NR Positioning" 3GPP TSG RAN WG1 Meeting #95 R1-1812519, Nov. 16, 2018.

(Continued)

*Primary Examiner* — Chi Tang P Cheng
*Assistant Examiner* — Michael Wayne Maddox
(74) *Attorney, Agent, or Firm* — Volpe Koenig

(57) ABSTRACT

A method for obtaining an angle of departure (AOD) of a terminal, comprising: angle measuring signals are sent to a receiving terminal at a plurality of sending positions; corresponding phase information of the angle measuring signals, sent by the receiving terminal, of the plurality of sending positions is received; and the AOD of the sending terminal is obtained according to the phase information of the angle measuring signals.

17 Claims, 16 Drawing Sheets

(56) References Cited

U.S. PATENT DOCUMENTS

| | | | |
|---|---|---|---|
| 2022/0397629 A1* | 12/2022 | McLaughlin | ............. G01S 3/48 |
| 2023/0147613 A1* | 5/2023 | Karjalainen | .......... G01S 5/0072 |
| | | | 342/463 |

FOREIGN PATENT DOCUMENTS

| | | | |
|---|---|---|---|
| CN | 110333478 A | 10/2019 | |
| CN | 110536234 A | 12/2019 | |

OTHER PUBLICATIONS

First Chinese Office Action issued on May 19, 2023 for Chinese Patent Application No. 2020800031959.

Chinese Office Action issued on Jan. 2, 2024 for Chinese Patent Application No. 2020800031959.

* cited by examiner

```
                                                          ⌐ S101
┌──────────────────────────────────────────────────┐
│ Send angle measuring signals to a receiving terminal at various │
│                  sending positions                │
└──────────────────────────────────────────────────┘
                          │
                          ▼                       ⌐ S102
┌──────────────────────────────────────────────────┐
│   Receive corresponding phase information of the angle │
│ measuring signals, sent by the receiving terminal, of the │
│             various sending positions              │
└──────────────────────────────────────────────────┘
                          │
                          ▼                       ⌐ S103
┌──────────────────────────────────────────────────┐
│ Obtain, according to the various phase information of the │
│ angle measuring signals, the angle of departure (AOD) of a │
│                 sending terminal                  │
└──────────────────────────────────────────────────┘
```

FIG. 1

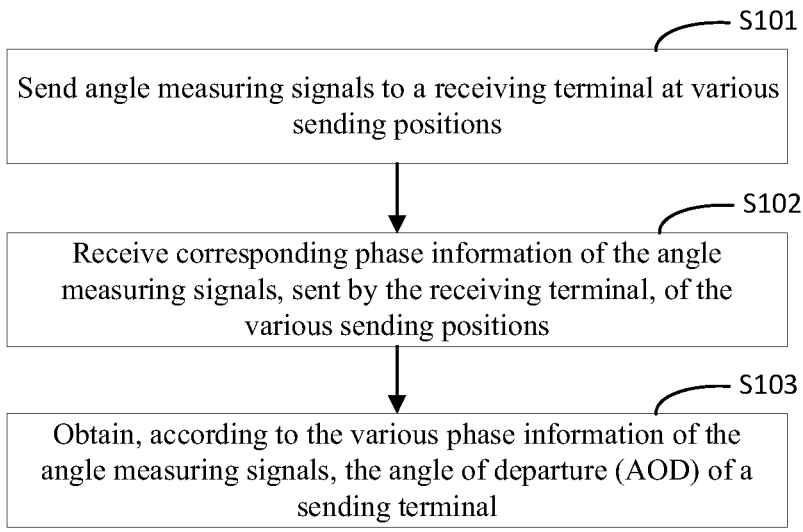

FIG. 2

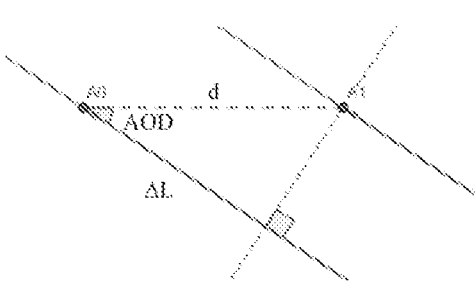

FIG. 3

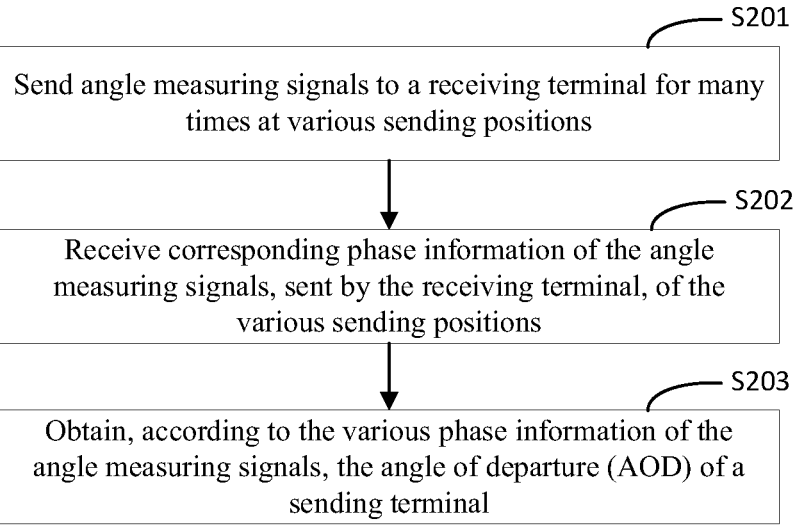

S201

Send angle measuring signals to a receiving terminal for many times at various sending positions

S202

Receive corresponding phase information of the angle measuring signals, sent by the receiving terminal, of the various sending positions

S203

Obtain, according to the various phase information of the angle measuring signals, the angle of departure (AOD) of a sending terminal

FIG. 4

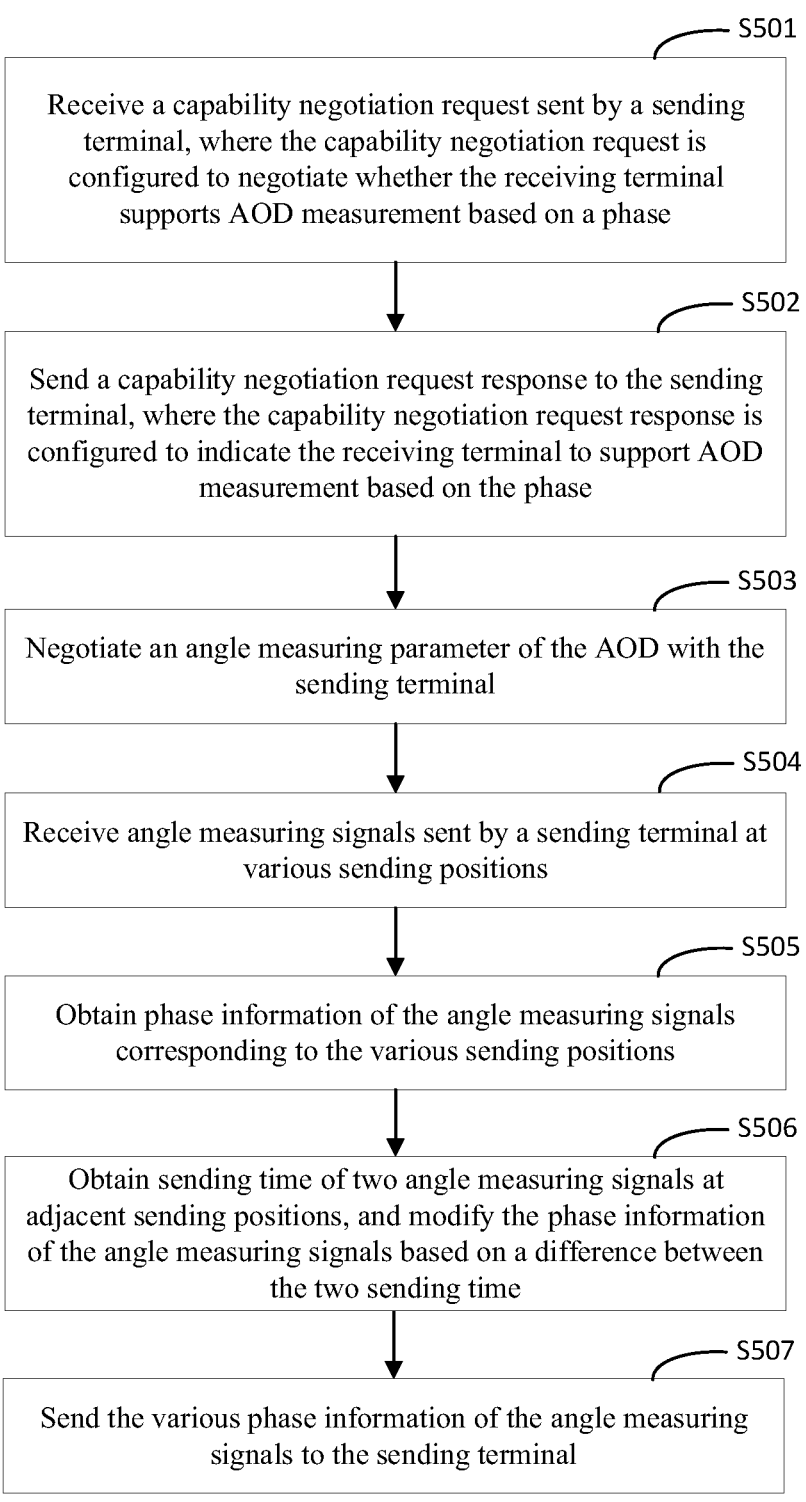

S501

Receive a capability negotiation request sent by a sending terminal, where the capability negotiation request is configured to negotiate whether the receiving terminal supports AOD measurement based on a phase

S502

Send a capability negotiation request response to the sending terminal, where the capability negotiation request response is configured to indicate the receiving terminal to support AOD measurement based on the phase

S503

Negotiate an angle measuring parameter of the AOD with the sending terminal

S504

Receive angle measuring signals sent by a sending terminal at various sending positions

S505

Obtain phase information of the angle measuring signals corresponding to the various sending positions

S506

Obtain sending time of two angle measuring signals at adjacent sending positions, and modify the phase information of the angle measuring signals based on a difference between the two sending time

S507

Send the various phase information of the angle measuring signals to the sending terminal

FIG. 7

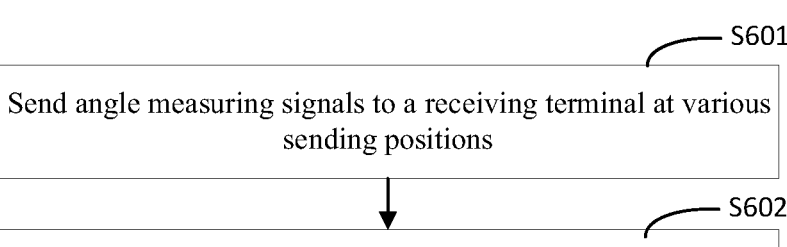

Send angle measuring signals to a receiving terminal at various sending positions Receive an angle of departure (AOD), sent by the receiving terminal, of a sending terminal, where the AOD is determined by the receiving terminal according to the phase information of the angle measuring signals corresponding to the various sending positions; and the phase information of the angle measuring signals is determined by the receiving terminal according to the angle measuring signals

FIG. 8

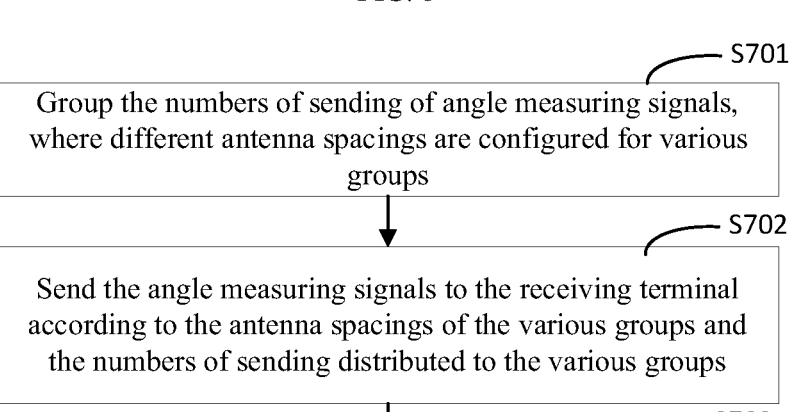

Group the numbers of sending of angle measuring signals, where different antenna spacings are configured for various groups Send the angle measuring signals to the receiving terminal according to the antenna spacings of the various groups and the numbers of sending distributed to the various groups Receive an angle of departure (AOD), sent by the receiving terminal, of a sending terminal for each group, where the AOD is determined by the receiving terminal according to the phase information of the angle measuring signals corresponding to the various sending positions; and the phase information of the angle measuring signals is determined by the receiving terminal according to the angle measuring signals

FIG. 9

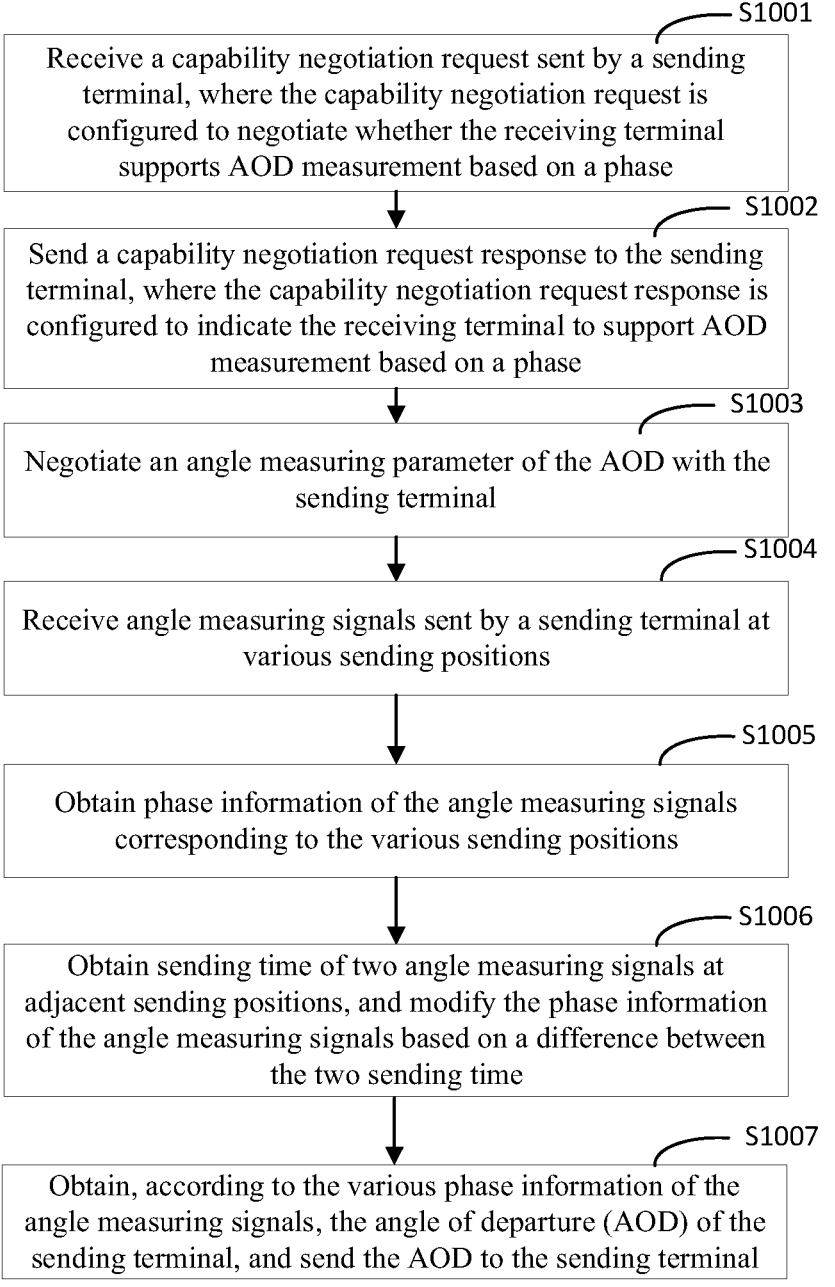

S1001

Receive a capability negotiation request sent by a sending terminal, where the capability negotiation request is configured to negotiate whether the receiving terminal supports AOD measurement based on a phase

S1002

Send a capability negotiation request response to the sending terminal, where the capability negotiation request response is configured to indicate the receiving terminal to support AOD measurement based on a phase

S1003

Negotiate an angle measuring parameter of the AOD with the sending terminal

S1004

Receive angle measuring signals sent by a sending terminal at various sending positions

S1005

Obtain phase information of the angle measuring signals corresponding to the various sending positions

S1006

Obtain sending time of two angle measuring signals at adjacent sending positions, and modify the phase information of the angle measuring signals based on a difference between the two sending time

S1007

Obtain, according to the various phase information of the angle measuring signals, the angle of departure (AOD) of the sending terminal, and send the AOD to the sending terminal

FIG. 12

METHOD AND APPARATUS FOR ACQUIRING ANGLE OF DEPARTURE (AOD) OF TERMINAL, AND COMMUNICATION DEVICE

CROSS-REFERENCE TO RELATED APPLICATION

The present application is a U.S. National Stage of International Application No. PCT/CN2020/128837, filed on Nov. 13, 2020, the contents of which are incorporated herein by reference in its entirety for all purposes.

BACKGROUND

At present, a relative position between two devices is mostly determined using a relative distance and a relative angle between the two devices in the ranging field. The relative angle may comprise an angle of arrival and an angle of departure (AOD).

SUMMARY

In the first aspect of the disclosure, a method for obtaining an angle of departure (AOD) of a terminal is provided, including: sending angle measuring signals to a receiving terminal at various sending positions; receiving corresponding phase information of the angle measuring signals, sent by the receiving terminal, of the various sending positions; and obtaining the AOD of the sending terminal according to the various phase information of the angle measuring signals.

In the second aspect of the disclosure, another method for obtaining an angle of departure (AOD) of a terminal is provided, including: receiving angle measuring signals sent by a sending terminal at various sending positions; obtaining phase information of the angle measuring signals corresponding to the various sending positions; and sending the various phase information of the angle measuring signals to the sending terminal.

In the third aspect of the disclosure, another method for obtaining an angle of departure (AOD) of a terminal is provided, including: receiving angle measuring signals sent by a sending terminal at various sending positions; obtaining phase information of the angle measuring signals corresponding to the various sending positions; and obtaining, according to the various phase information of the angle measuring signals, the AOD of the sending terminal, and sending the AOD to the sending terminal.

In the fourth aspect of the disclosure, the examples provide a communication device, including: at least one processor; and a memory communicatively connected with the at least one processor, where the memory stores instructions executable by the at least one processor, and when executed by the at least one processor, the instructions cause the at least one processor to perform the method for obtaining the angle of departure (AOD) of the terminal according to the first aspect of the disclosure, or the method for obtaining the angle of departure (AOD) of the terminal according to the second aspect of the disclosure, or the method for obtaining the angle of departure (AOD) of the terminal according to the third aspect of the disclosure.

Additional aspects and advantages of the disclosure will be partially given in the following description, and will become apparent from the following description or be learned from the practice of the disclosure.

BRIEF DESCRIPTION OF THE DRAWINGS

The above and/or additional aspects and advantages of the disclosure will become apparent and understandable from the description of examples with reference to the accompanying drawings.

FIG. 1 is a flowchart of a method for obtaining an angle of departure (AOD) of a terminal provided by an example of the disclosure;

FIG. 2 is a schematic diagram of angle measuring signals in a method for obtaining an angle of departure (AOD) of a terminal provided by an example of the disclosure;

FIG. 3 is a schematic diagram of obtaining an AOD of a sending terminal in a method for obtaining an angle of departure (AOD) of a terminal provided by an example of the disclosure;

FIG. 4 is a flowchart of another method for obtaining an angle of departure (AOD) of a terminal provided by an example of the disclosure;

FIG. 7 is a flowchart of another method for obtaining an angle of departure (AOD) of a terminal provided by an example of the disclosure;

FIG. 8 is a flowchart of another method for obtaining an angle of departure (AOD) of a terminal provided by an example of the disclosure;

FIG. 9 is a flowchart of another method for obtaining an angle of departure (AOD) of a terminal provided by an example of the disclosure;

FIG. 12 is a flowchart of another method for obtaining an angle of departure (AOD) of a terminal provided by an example of the disclosure;

DETAILED DESCRIPTION

Figure 5:
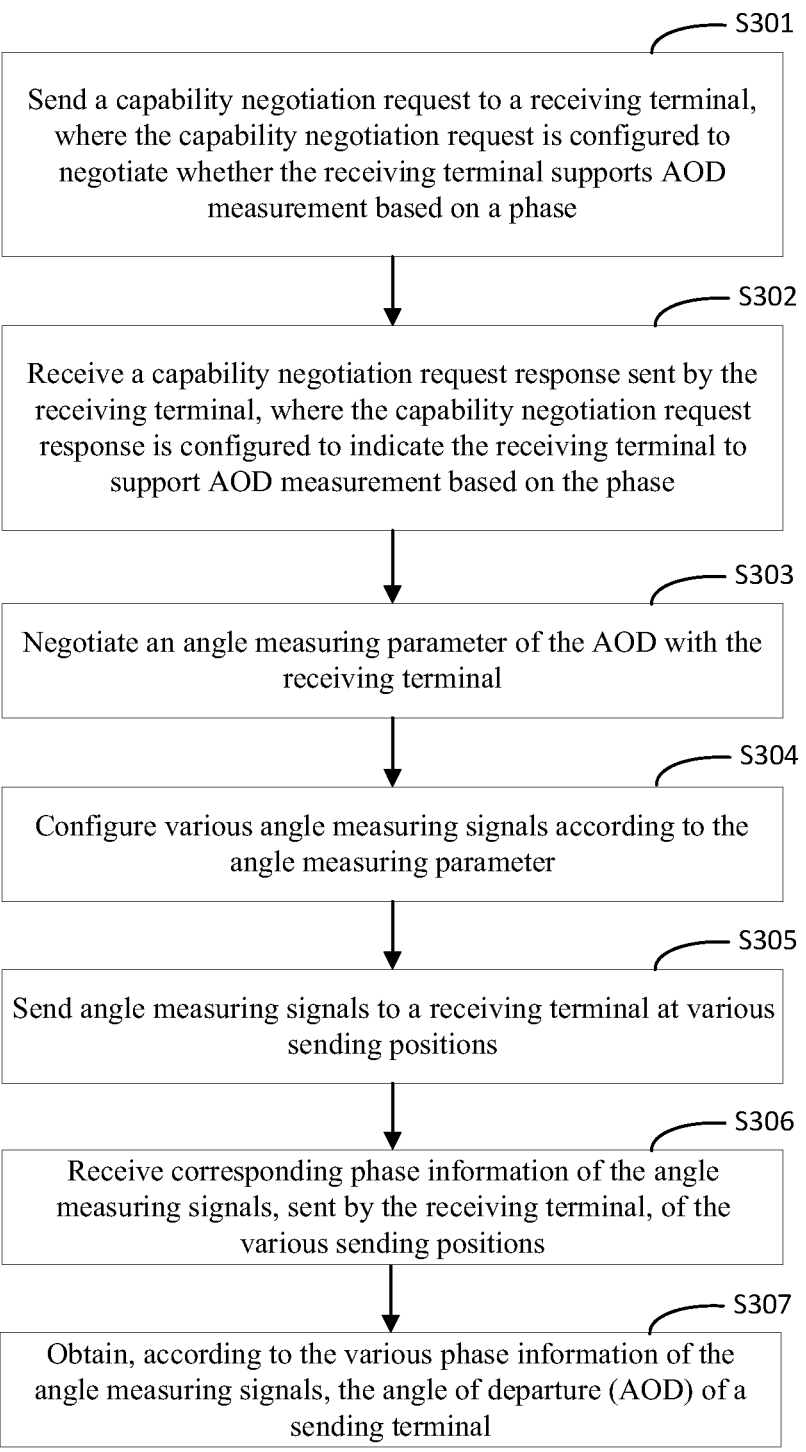
FIG. 5 is a flowchart of another method for obtaining an angle of departure (AOD) of a terminal provided by an example of the disclosure.

The disclosure relates to the technical field of wireless communication, and in particular to a method and apparatus for obtaining an angle of departure (AOD) of a terminal, a communication device, and a storage medium.

At present, a relative position between two devices is mostly determined using a relative distance and a relative angle between the two devices in the ranging field. The relative angle may comprise an angle of arrival and an angle of departure (AOD). However, the AOD cannot be obtained in a long term evolution (LTE) and a new radio (NR).

A method and apparatus for obtaining an angle of departure (AOD) of a terminal, a communication device, and a storage medium provided by the disclosure are used for solving the problem in the related art that the AOD cannot be obtained in a long term evolution (LTE) and a new radio (NR).

Examples will be described in detail here, and instances thereof are shown in the accompanying drawings. The following description refers to the accompanying drawings in which the same numbers in different figures represent the same or similar elements unless otherwise indicated. Implementations set forth in the following description of examples do not represent all implementations consistent with the disclosure. Instead, the implementations are merely examples of apparatuses and methods consistent with some aspects of the examples of the disclosure as detailed in the appended claims.

The terms used in the examples of the disclosure are merely for describing specific examples, rather than limiting the examples of the disclosure. The terms "a/an" and "the" in singular forms used in the examples and the appended claims of the disclosure are also intended to include plural forms, unless otherwise clearly indicated in the context. It should be further understood that the term "and/or" used in the specification refers to and includes any or all possible combinations of one or more associated listed items.

It should be understood that although the terms "first", "second", "third", and the like may be used in the examples of the disclosure to describe all types of information, the information is not limited to the terms. The terms are merely used to distinguish the same type of information from one another. For example, without departing from the scope of the examples of the disclosure, the first information may also be referred to as second information, and similarly, the second information may also be referred to as first information. Depending on the context, the words "if" and "as if" as used in the specification may be interpreted as "when" or "while" or "in response to determining".

The examples of the disclosure are described in detail below, and the examples of the examples are shown in the drawings, where the same or similar reference numerals throughout represent the same or similar elements. The examples described below with reference to the accompanying drawings are exemplary, are intended to explain the disclosure, and cannot be understood as limitations to the disclosure.

The following describes a method and apparatus for obtaining an angle of departure (AOD) of a terminal, a communication device, and a storage medium provided in the disclosure in detail with reference to the accompanying drawings.

FIG. 1 is a schematic diagram of a method for obtaining the angle of departure (AOD) of the terminal provided by an example of the disclosure.

As shown in FIG. 1, the method for obtaining an angle of departure (AOD) of a terminal according to the example of the present invention includes the following steps S101-S103.

S101, includes sending angle measuring signals to a receiving terminal at various sending positions.

It is to be noted that in the method for obtaining the angle of departure (AOD) of the terminal according to the example of the present invention, an execution main body is a sending terminal, where the sending terminal includes, but is not limited to: a mobile phone, a computer, an intelligent wearable device, an intelligent home appliance, a vehicle terminal and the like, which is not defined too much here.

In the examples of the disclosure, the sending terminal may send the angle measuring signals to the receiving terminal at the various sending positions. Optionally, the sending terminal is provided with an antenna array, and may send the angle measuring signals to the receiving terminal at the various sending positions through its own antenna array.

In all the examples of the disclosure, "various sending positions" refer to preset sending positions, and may further be randomly determined emission positions; and "various sending positions" refer to two or more emission positions. In some possible examples, "various sending positions" correspond to that one terminal sends signals at two or more different positions using one antenna. In some possible examples, "various sending positions" correspond to that one terminal sends signals at two or more different positions using different antennas. In some examples, "various sending positions" correspond to the case where one terminal sends signals at one position using different antennas. Certainly, the above three different modes may be separately used and may further be matched together for use. For example, the signals are sent using one antenna at a part of the sending positions, and the signals are sent using different antennas at the other part of the sending positions. For example, candidate emission positions are {A, B, C, D . . . Z}. In some implementations, the sending terminal may select one sending position therefrom, and send angle measuring signals through a plurality of antennas of the sending terminal respectively; for example, the sending terminal sends the angle measuring signals at position A through different antennas in the antenna array of the sending terminal respectively. In another implementation, the sending terminal may select a plurality of sending positions therefrom, and send angle measuring signals through one antenna at various sending positions; for example, the sending terminal sends the angle measuring signals at the position A, the position B, and the position C through one antenna. In yet some implementations, the sending terminal may select one or more sending positions therefrom, and sends angle measuring signals through different antennas at various sending positions; for example, the sending terminal sends the angle measuring signals at the position A, the position B and the position C through the antenna 1, the antenna 2 and the antenna 3 in the antenna array of the sending terminal respectively. In yet some implementations, the sending terminal may select one or more sending positions therefrom, and sends angle measuring signals through same or different antennas at various sending positions; for example, the sending terminal sends the angle measuring signals at the position A, the position B and the position C through one antenna; the sending terminal sends the angle measuring signals at the position X, the position Y and the position Z through the antenna 1, the antenna 2 and the antenna 3 in the antenna array of the sending terminal respectively; and the sending terminal sends the angle measuring signals at the position M through the antenna 1, the antenna 2 and the antenna 3 in the antenna array.

In all the examples of the disclosure, the angle measuring signals may be sent for one or more times at each sending position; while a number of sending may be self-determined by the sending terminal, or determined according to a communication protocol, or configured by a network-side device, or pre-stored in the sending terminal.

Optionally, the sending terminal may send angle measuring signals at a plurality of different azimuth angles to the receiving terminal. For example, as shown in FIG. 2, the sending terminal may send the angle measuring signals at azimuth angles of 0°, 10°, 20° to 350°; and a difference between the adjacent angle measuring signals in azimuth angle is 10°.

In step S102, receiving corresponding phase information of the angle measuring signals, sent by the receiving terminal, of the various sending positions.

In the examples of the disclosure, after the sending terminal sends the angle measuring signals to the receiving terminal at the various sending positions, the receiving terminal may obtain the corresponding phase information of the angle measuring signals of the various sending positions, and send the corresponding phase information of the angle measuring signals of the various sending positions to the sending terminal; and further, the sending terminal may receive the corresponding phase information of the angle measuring signals, sent by the receiving terminal, of the various sending positions.

It is to be understood that the angle measuring signals for different sending positions may correspond to different phase information of the angle measuring signals, where the phase information of the angle measuring signals may be any value in (0°-360°), or may be any value in (−180°-180°).

Then, in step S103, obtaining, according to the various phase information of the angle measuring signals, the angle of departure (AOD) of a sending terminal.

In examples of the disclosure, after the sending terminal receives the corresponding phase information of the angle measuring signals, sent by the receiving terminal, of the various sending positions, the sending terminal may obtain the angle of departure (AOD) of the sending terminal according to the various phase information of the angle measuring signals.

Optionally, the obtaining, according to the various phase information of the angle measuring signals, the angle of AOD of a sending terminal may include: obtaining an angle measuring phase difference according to various phase information of the angle measuring signals; then, calculating a time difference between the angle measuring signals according to the angle measuring phase difference; and then, calculating the AOD of the sending terminal according to the time difference and the antenna spacing.

For example, as shown in FIG. 3, it is assumed that the sending terminal sends the angle measuring signals through an antenna A0 and an antenna A1 respectively, a time difference between the angle measuring signal sent by the antenna A0 and the angle measuring signal sent by the antenna A1 is Δt, and an antenna spacing between the antenna A0 and the antenna A1 is d. ΔL is a change in length between the various sending positions and is calculated using the time difference Δt between the time at which the various sending positions were determined and c, which is the speed of light. The AOD of the sending terminal may be calculated using the following formula:

$$AOD = \arccos{(\Delta L/d)}$$

$$\Delta L = \Delta t * c$$

In the method for obtaining the angle of departure (AOD) of the terminal according to the examples of the disclosure, the sending terminal may send the angle measuring signals to the receiving terminal at the various sending positions, and receive the corresponding phase information of the angle measuring signals, sent by the receiving terminal, of the various sending positions, so as to obtain the AOD of the sending terminal according to the various phase information of the angle measuring signals. Thus, the sending terminal may determine, by sending the angle measuring signals to the receiving terminal, the AOD of the sending terminal according to the phase information of the angle measuring signals fed back by the receiving terminal. In the above solution, the AOD may be obtained in a long term evolution (LTE) network, new radio (NR) network and any generation of a proper communication network.

FIG. 4 is a schematic diagram of another method for obtaining an angle of departure (AOD) of a terminal provided by an example of the disclosure.

As shown in FIG. 4, the method for obtaining an angle of departure (AOD) of a terminal according to the example of the present invention includes the following steps S201-S203.

In S201, sending angle measuring signals to a receiving terminal many times at various sending positions.

It is to be understood that, as the positions of the sending terminal and the receiving terminal may be changed, the AOD of the sending terminal may also be changed. In the examples of the disclosure, the sending terminal may send angle measuring signals to the receiving terminal at various sending positions, so that the receiving terminal may redetermine, according to the angle measuring signals sent by the sending terminal at the various sending positions respectively, phase information of the angle measuring signals corresponding to the various sending positions. Then, the sending terminal may redetermine, according to the redetermined phase information of the angle measuring signals, the AOD of the sending terminal, which is conducive to updating the AOD of the sending terminal timely.

Optionally, the sending angle measuring signals to a receiving terminal for many times at various sending positions may include a plurality of the foregoing modes: the following illustrates by way of example, through two possible implementations, Mode 1 and Mode 2.

Mode 1, the angle measuring signals are sent to the receiving terminal according to a preset number of sending corresponding to the various sending positions.

In the examples of the disclosure, the sending terminal may send the angle measuring signals to the receiving terminal according to the preset numbers of sending corresponding to the various sending positions; and correspondingly, the receiving terminal may further receive the angle measuring signals sent by the sending terminal for the preset numbers of sending at the various sending positions.

It is to be understood that different sending positions may correspond to different preset numbers of sending. Continuing with FIG. 2 as an example, the preset number of sending corresponding to the azimuth angle of 10° may be 10; and the preset number of sending corresponding to the azimuth angle of 20° may be 5.

Mode 2, the angle measuring signals are periodically sent to the receiving terminal at the various sending positions according to a sending period.

In the examples of the disclosure, the sending terminal may send the angle measuring signals to the receiving terminal at the various sending positions according to the sending period; and correspondingly, the receiving terminal may further receive the angle measuring signals periodically sent by the sending terminal at the various sending positions, where the sending period may be set according to the actual condition, for example, may be set at 10 minutes.

For example, in response to the sending period being 10 minutes, the sending terminal may send the angle measuring signals to the receiving terminal at the various sending positions in each sending period; and a spacing between adjacent sending is 10 minutes.

Referring back to FIG. 4, in S202, receiving corresponding phase information of the angle measuring signals, sent by the receiving terminal, of the various sending positions.

In S203, obtaining, according to the various phase information of the angle measuring signals, the angle of departure (AOD) of a sending terminal. In the examples of the disclosure, step S202 and step S203 may be implemented using any one in various examples of the disclosure; and the examples of the disclosure are not limited in that regard and will not be detailed here.

In the method for obtaining the angle of departure (AOD) of the terminal according to the examples of the disclosure, the sending terminal may send the angle measuring signals to the receiving terminal for many times at the various sending positions, and receive the corresponding phase information of the angle measuring signals, sent by the receiving terminal, of the various sending positions, so as to obtain the AOD of the sending terminal according to the various phase information of the angle measuring signals. Thus, the sending terminal may send the angle measuring signals to the receiving terminal at the various sending positions, so that the sending terminal may redetermine the AOD of the sending terminal, which is conducive to updating the AOD of the sending terminal timely.

FIG. 5 is a schematic diagram of another method for obtaining an angle of departure (AOD) of a terminal provided by an example of the disclosure.

As shown in FIG. 5, the method for obtaining an angle of departure (AOD) of a terminal according to the example of the present invention includes the following steps of making the sending terminal determine whether to support AOD measurement based on a phase with the receiving terminal.

In some implementations, the above steps may be initiated by the sending terminal; that is, the method includes steps S301 and S302.

S301, sending a capability negotiation request to a receiving terminal, where the capability negotiation request is configured to negotiate whether the receiving terminal supports AOD measurement based on a phase.

In the examples of the disclosure, before the sending terminal sends the angle measuring signals to the receiving terminal at the various sending positions, the sending terminal may send the capability negotiation request to the receiving terminal, where the capability negotiation request is configured to negotiate whether the receiving terminal supports AOD measurement based on the phase.

S302, receiving a capability negotiation request response sent by the receiving terminal, where the capability negotiation request response is configured to indicate the receiving terminal to support AOD measurement based on the phase.

In the examples of the disclosure, the sending terminal may receive a capability negotiation request response sent by the receiving terminal, and the capability negotiation request response indicates the receiving terminal to support AOD measurement based on the phase, which shows that the method for obtaining the angle of departure (AOD) of the terminal in the examples of the disclosure may be applied to the receiving terminal; and following steps S303-S307 may be continued to be executed.

As another possible implementation, the capability negotiation request response indicates that the receiving terminal does not support AOD measurement based on the phase, which shows that the method for obtaining the angle of departure (AOD) of the terminal in the examples of the disclosure cannot be applied to the receiving terminal; and there is no need for continuing to execute following steps S303-S307.

Optionally, the capability negotiation request may be sent or the capability negotiation request response may be received through the terminal capability enquiry sidelink (user equipment capability enquiry sidelink) or the terminal capability information sidelink (user equipment capability information sidelink).

In another some implementations, the above steps may be initiated by the receiving terminal; that is, the method includes: receiving a capability negotiation request sent by the receiving terminal, where the capability negotiation request is configured to negotiate whether the sending terminal supports AOD measurement based on the phase; and sending a capability negotiation request response to the receiving terminal, where the capability negotiation request response indicates the sending terminal to support AOD measurement based on the phase.

In the examples of the disclosure, the sending terminal performs capability negotiation with the receiving terminal; and in response to both the sending terminal and the receiving terminal supporting AOD measurement based on the phase, following steps S303-S307 are continued to be executed.

As another possible implementation, the sending terminal performs capability negotiation with the receiving terminal, and in response to any one of the sending terminal and the receiving terminal not supporting AOD measurement based on the phase, the following steps S303-S307 are not executed.

S303, negotiating an angle measuring parameter of the AOD with the receiving terminal.

In the examples of the disclosure, before the sending terminal sends the angle measuring signals to the receiving terminal at the various sending positions, the sending terminal may negotiate the angle measuring parameter of the AOD with the receiving terminal. It is to be understood that the angle measuring parameter is configured to indicate the sending terminal to send the angle measuring signals to the receiving terminal at the various sending positions.

Optionally, the angle measuring parameter includes: one or more of the sending period, the number of sending and a sending duration per sending for the angle measuring signals, a sending period for the phase information of the angle measuring signals, an angle measuring type and an angle measuring period of triggering angle measurement. Where the sending period of the angle measuring signals may include a time interval between adjacent sent angle measuring signals; the sending period of the phase information of the angle measuring signals may include a time interval between adjacent sent phase information of the angle measuring signals; the angle measuring type may include an angle of arrival (AOA) and an angle of departure (AOD); and an angle measuring period of triggering angle measurement may include a time interval between adjacent angle measurements.

Optionally, negotiating an angle measuring parameter of the AOD with the receiving terminal may use one of the following modes.

Mode 1, sending the angle measuring parameter to the receiving terminal. In some possible implementations, an angle measuring request may be sent to the receiving terminal, where the angle measuring request carries the angle measuring parameter. In some possible implementations, the angle measuring request may carry the angle measuring parameter at the same time as negotiating whether to support AOD measurement based on the phase. In some possible implementations, after whether to support AOD measurement based on the phase is negotiated, there is no need for sending the angle measuring parameter in the case of reaching agreement. In some possible implementations, resource scheduling information sent by the receiving terminal may carry the angle measuring parameter. It is to be understood that the sending terminal is equipped with a resource pool and may schedule resources from the resource pool according to a certain resource scheduling rule. In order to ensure information transmission with the receiving terminal, the corresponding resource scheduling information may be sent to the receiving terminal.

Mode 2: receiving signaling carrying the angle measuring parameter sent by the receiving terminal. In some possible implementations, an angle measuring request response sent by the receiving terminal may be received, where the angle measuring request response carries the angle measuring request response carries the angle measuring parameter. In some possible implementations, the angle measuring request sent by the receiving terminal may carry the angle measuring parameter at the same time as negotiating whether to support AOD measurement based on the phase. In some possible implementations, after whether to support AOD measurement based on the phase is negotiated, there is no need for sending the angle measuring parameter in the case of reaching agreement. Optionally, the angle measuring parameter or the signaling carrying the angle measuring parameter may be sent through a radio resource control (RRC) message corresponding to a link interface (PC5) between the terminals (PC5-RRC) and a signaling protocol message corresponding to a link interface (PC5) between the terminals (PC5-S).

S304, configuring various angle measuring signals according to the angle measuring parameter.

In the examples of the disclosure, before the sending terminal sends the angle measuring signals to the receiving terminal at the various sending positions, various angle measuring signals may be configured according to the angle measuring parameter in response to reaching the angle measuring period of triggering angle measurement each time.

For example, the angle measuring signals may be periodically sent to the receiving terminal at the various sending positions according to the sending period of the angle measuring signals in the angle measuring parameter.

S305, sending angle measuring signals to a receiving terminal at various sending positions.

S306, receiving corresponding phase information of the angle measuring signals, sent by the receiving terminal, of the various sending positions.

S307, obtaining, according to the various phase information of the angle measuring signals, the angle of departure (AOD) of a sending terminal.

In the examples of the disclosure, steps S305, S306, and S307 may be implemented using any one in various examples of the disclosure; and the examples of the disclosure are not limited in that regard and will not be detailed here.

In the method for obtaining the angle of departure (AOD) of the terminal according to the examples of the disclosure, the sending terminal negotiates whether to support AOD measurement based on the phase with the receiving terminal, may negotiate the angle measuring parameter of the AOD with the receiving terminal, and configures the various angle measuring signals in response to reaching into the angle measuring period of triggering angle measurement each time. The sending terminal may send the angle measuring signals to the receiving terminal at the various sending positions, may receive the corresponding phase information of the angle measuring signals, sent by the receiving terminal, of the various sending positions, and may obtain the AOD of the sending terminal according to the various phase information of the angle measuring signals. Thus, the sending terminal may determine, by sending the angle measuring signals to the receiving terminal, the AOD of the sending terminal according to the phase information of the angle measuring signals fed back by the receiving terminal.

Figure 6:
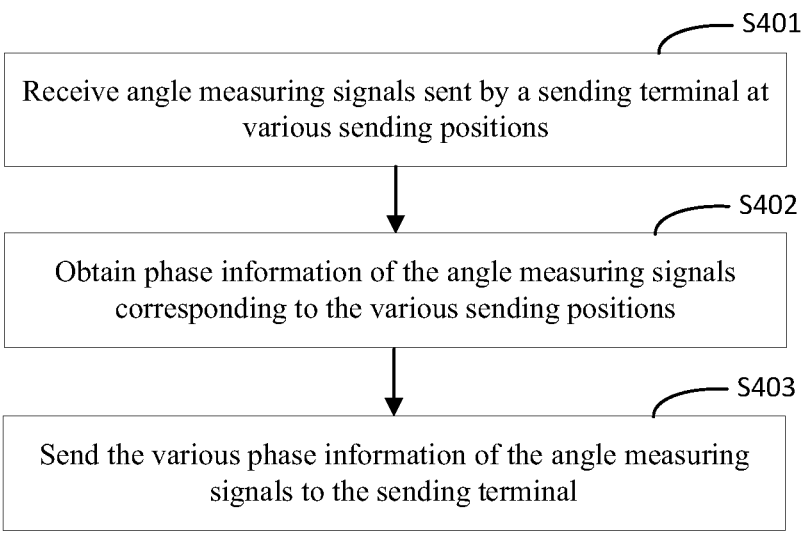
FIG. 6 is a flowchart of another method for obtaining an angle of departure (AOD) of a terminal provided by an example of the disclosure.

FIG. 6 is a schematic diagram of another method for obtaining an angle of departure (AOD) of a terminal provided by an example of the disclosure.

As shown in FIG. 6, the method for obtaining an angle of departure (AOD) of a terminal according to the example of the present invention includes the following steps S401-S403.

At step S401, the angle measuring signals sent by the sending terminal at the various sending positions are received.

It is to be noted that in the method for obtaining the angle of departure (AOD) of the terminal according to the example of the present invention, an execution main body is the receiving terminal, where the receiving terminal includes, but is not limited to: a mobile phone, a computer, an intelligent wearable device, an intelligent home appliance, a vehicle terminal and the like, which is not defined too much here.

In the examples of the disclosure, the receiving terminal may receive the angle measuring signals sent by the sending terminal at the various sending positions. Optionally, the receiving terminal is provided with an antenna array, and may receive the angle measuring signals sent by the sending terminal at the various sending positions through its own antenna array.

In all the examples of the disclosure, "various sending positions" refer to preset sending positions, and may further be randomly determined emission positions; and "various sending positions" refer to two or more emission positions. In some possible examples, "various sending positions" correspond to that one terminal sends signals at two or more different positions using one antenna. In some possible examples, "various sending positions" correspond to that one terminal sends signals at two or more different positions using different antennas. In yet some examples, "various sending positions" correspond to that one terminal sends signals at one position using different antennas. Certainly, the above three different modes may be separately used, and may further be matched together for use. For example, the signals are sent using one antenna at a part of the sending positions; and the signals are sent using different antennas at the other part of the sending positions. For example, candidate emission positions are {A, B, C, D . . . Z}. In some implementations, the sending terminal may select one sending position therefrom, and send angle measuring signals through a plurality of antennas of the sending terminal respectively; for example, the sending terminal sends the angle measuring signals at position A through different antennas in the antenna array of the sending terminal respectively. In another implementation, the sending terminal may select a plurality of sending positions therefrom, and send angle measuring signals through one antenna at various sending positions; for example, the sending terminal sends the angle measuring signals at the position A, the position B, and the position C through one antenna. In yet some implementations, the sending terminal may select one or more sending positions therefrom, and sends angle measuring signals through different antennas at various sending positions; for example, the sending terminal sends the angle measuring signals at the position A, the position B and the position C through the antenna 1, the antenna 2 and the antenna 3 in the antenna array of the sending terminal respectively. In yet some implementations, the sending terminal may select one or more sending positions therefrom, and sends angle measuring signals through same or different antennas at various sending positions; for example, the sending terminal sends the angle measuring signals at the position A, the position B and the position C through one antenna; the sending terminal sends the angle measuring signals at the position X, the position Y and the position Z through the antenna 1, the antenna 2 and the antenna 3 in the antenna array of the sending terminal respectively; and the sending terminal sends the angle measuring signals at the position M through the antenna 1, the antenna 2 and the antenna 3 in the antenna array.

In all the examples of the disclosure, the angle measuring signals may be sent for one or more times at each sending position; while a number of sending may be self-determined by the sending terminal, or determined according to a communication protocol, or configured by a network-side device, or pre-stored in the sending terminal.

Optionally, the receiving terminal may receive the angle measuring signals sent by the sending terminal for many times at the various sending positions.

S402, obtaining phase information of the angle measuring signals corresponding to the various sending positions.

In the examples of the disclosure, after the receiving terminal receives the angle measuring signals sent by the sending terminal at the various sending positions, the receiving terminal may obtain the phase information of the angle measuring signals corresponding to the various sending positions.

It is to be understood that the angle measuring signals for different sending positions may correspond to different phase information of the angle measuring signals, where the phase information of the angle measuring signals may be any value in (0°-360°), or may be any value in (−180°-180°).

At step S403, the various phase information of the angle measuring signals are sent to the sending terminal.

In examples of the disclosure, after the receiving terminal receives the phase information of the angle measuring signals corresponding to the various sending positions, the receiving terminal may send the various phase information of the angle measuring signals to the sending terminal.

Optionally, the receiving terminal may further send, in response to reaching the sending period of the phase information of the angle measuring signals each time, the various phase information of the angle measuring signals to the sending terminal.

In the method for obtaining the angle of departure (AOD) of the terminal according to the examples of the disclosure, the receiving terminal may receive the angle measuring signals sent by the sending terminal at the various sending positions, may obtain the phase information of the angle measuring signals corresponding to the various sending positions, and sends the various phase information of the angle measuring signals to the sending terminal. Thus, the receiving terminal may send the various phase information of the angle measuring signals to the sending terminal, for the sending terminal to determine the AOD of the sending terminal according to the phase information of the angle measuring signals.

FIG. 7 is a schematic diagram of another method for obtaining an angle of departure (AOD) of a terminal provided by an example of the disclosure.

As shown in FIG. 7, the method for obtaining an angle of departure (AOD) of a terminal according to the example of the present invention includes the following steps of making the receiving terminal determine whether to support AOD measurement based on the phase with the sending terminal.

In some implementations, the above steps may be initiated by the sending terminal; that is, the method includes steps S501 and S502.

At step S501, the capability negotiation request sent by the sending terminal is received, where the capability negotiation request is configured to negotiate whether the receiving terminal supports AOD measurement based on a phase.

In the examples of the disclosure, before the receiving terminal receives the angle measuring signals sent by the sending terminal at the various sending positions, the receiving terminal may receive the capability negotiation request sent by the sending terminal, where the capability negotiation request is configured to negotiate whether the receiving terminal supports AOD measurement based on the phase.

At step S502, the capability negotiation request response to the sending terminal is sent, where the capability negotiation request response is configured to indicate the receiving terminal to support AOD measurement based on the phase.

In the examples of the disclosure, the receiving terminal may send the capability negotiation request response to the sending terminal, and the capability negotiation request response indicates the receiving terminal to support AOD measurement based on the phase, which shows that the method for obtaining the angle of departure (AOD) of the terminal in the examples of the disclosure may be applied to the receiving terminal; and following steps S503-S507 may be continued to be executed.

As another possible implementation, the capability negotiation request response indicates the receiving terminal does not support AOD measurement based on the phase, which shows that the method for obtaining the angle of departure (AOD) of the terminal in the examples of the disclosure cannot be applied to the receiving terminal; and there is no need for continuing to execute following steps S503-S507.

Optionally, the capability negotiation request may be received or the capability negotiation request response may be sent through the terminal capability enquiry sidelink (user equipment capability enquiry sidelink) or the terminal capability information sidelink (user equipment capability information sidelink).

In another some implementations, the above steps may be initiated by the receiving terminal; that is, the method includes: receiving a capability negotiation request sent by the receiving terminal, where the capability negotiation request is configured to negotiate whether the sending terminal supports AOD measurement based on the phase; and sending a capability negotiation request response to the receiving terminal, where the capability negotiation request response indicates the sending terminal to support AOD measurement based on the phase.

In the examples of the disclosure, the sending terminal performs capability negotiation with the receiving terminal; and in response to both the sending terminal and the receiving terminal supporting AOD measurement based on the phase, following steps S503-S507 are continued to be executed.

As another possible implementation, the sending terminal performs capability negotiation with the receiving terminal; and in response to any one of the sending terminal and the receiving terminal not supporting AOD measurement based on the phase, following steps S503-S507 are not continued to be executed.

At step S503, the angle measuring parameter of the AOD with the sending terminal is negotiated.

In the examples of the disclosure, before the receiving terminal receives the angle measuring signals send by the sending terminal at the various sending positions, the receiving terminal may negotiate the angle measuring parameter of the AOD with the sending terminal. It is to be understood that the angle measuring parameter is configured to indicate the sending terminal to send the angle measuring signals to the receiving terminal at the various sending positions.

Optionally, the angle measuring parameter includes: one or more of the sending period, the number of sending and a sending duration per sending for the angle measuring signals, a sending period for the phase information of the angle measuring signals, an angle measuring type and an angle measuring period of triggering angle measurement. Where the sending period of the angle measuring signals may include a time interval between adjacent sent angle measuring signals; the sending period of the phase information of the angle measuring signals may include a time interval between adjacent sent phase information of the angle measuring signals; the angle measuring type may include an angle of arrival (AOA) and an angle of departure (AOD); and an angle measuring period of triggering angle measurement may include a time interval between adjacent angle measurements.

Optionally, negotiating the angle measuring parameter of the AOD with the sending terminal may use one of following negotiating modes.

Mode 1, receiving the angle measuring parameter sent by the sending terminal. In some possible implementations, the angle measuring request may be received sent by the receiving terminal, where the angle measuring request carries the angle measuring parameter. In some possible implementations, the angle measuring request may carry the angle measuring parameter at the same time as negotiating whether to support AOD measurement based on the phase. In some possible implementations, after negotiating whether to support AOD measurement based on the phase, there is no need to receive the angle measuring parameter in the case of reaching an agreement. In some possible implementations, resource scheduling information sent by the sending terminal may be received, and carries the angle measuring parameter. It is to be understood that the sending terminal is equipped with a resource pool, and may schedule resources from the resource pool according to a certain resource scheduling rule. In order to ensure information transmission with the receiving terminal, the corresponding resource scheduling information may be sent to the receiving terminal.

Mode 2, sending the angle measuring parameter to the sending terminal. In some possible implementations, the angle measuring request response may be sent to the sending terminal, where the angle measuring request response carries the angle measuring parameter. In some possible implementations, the angle measuring request sent to the receiving terminal may carry the angle measuring parameter at the same time as negotiating whether to support AOD measurement based on the phase. In some possible implementations, after whether to support AOD measurement based on the phase is negotiated, there is no need for sending the angle measuring parameter in the case of reaching agreement.

Optionally, the angle measuring parameter or the signaling carrying the angle measuring parameter may be transmitted through a radio resource control (RRC) message corresponding to a link interface (PC5) between the terminals (PC5-RRC) and a signaling protocol message corresponding to a link interface (PC5) between the terminals (PC5-S).

At step S504, the angle measuring signals sent by the sending terminal at the various sending positions are received.

At step S505, phase information of the angle measuring signals corresponding to the various sending positions is obtained.

At step S506, sending time of two angle measuring signals at adjacent sending positions is obtained, and the phase information of the angle measuring signals based on a difference between the two sending time is modified.

In the examples of the disclosure, the phase information of the angle measuring signals may be an angle measuring phase difference between two angle measuring signals. It is to be understood that the angle measuring phase difference may be affected by the different sending times of the two angle measuring signals.

In the examples of the disclosure, the sending time of the two angle measuring signals at adjacent sending positions may be obtained, and the phase information of the angle measuring signals is modified based on the difference between the two sending times, so that the phase information of the angle measuring signals is not affected by different sending time of the two angle measuring signals. Thus, the obtained phase information of the angle measuring signals is more accurate.

Optionally, obtaining the sending time of the two angle measuring signals at adjacent sending positions, and modifying the phase information of the angle measuring signals based on the difference between the two sending time may include: subtracting the difference between the two sending time from the phase information of the angle measuring signals before modification, to serve as the modified phase information of the angle measuring signals.

S507, sending the various phase information of the angle measuring signals to the sending terminal.

In the examples of the disclosure, step S504, step S505 and step S507 may be implemented using any one in various examples of the disclosure; and the examples of the disclosure are not limited in that regard and will not be detailed here.

In the method for obtaining the angle of departure (AOD) of the terminal according to the examples of the disclosure, the receiving terminal negotiates whether to support AOD measurement based on a phase with the sending terminal, may negotiates the angle measuring parameter of the AOD with the sending terminal, receives the angle measuring signals sent by the sending terminal at the various sending positions, obtains the phase information of the angle measuring signals corresponding to the various sending positions, may further obtain the sending time of the two angle measuring signals at adjacent sending positions, modifies the phase information of the angle measuring signals based on a difference between the two sending time, and sends the various phase information of the angle measuring signals to the sending terminal. Thus, the receiving terminal may send the various phase information of the angle measuring signals to the sending terminal, for the sending terminal to determine the AOD of the sending terminal according to the phase information of the angle measuring signals.

FIG. 8 is a schematic diagram of another method for obtaining an angle of departure (AOD) of a terminal provided by an example of the disclosure.

As shown in FIG. 8, the method for obtaining an angle of departure (AOD) of a terminal according to the example of the present invention includes the following steps S601 and S602.

In S601, sending angle measuring signals to a receiving terminal at various sending positions.

In the examples of disclosure, step S601 may be implemented using anyone in various examples of disclosure; the examples of disclosure are not limited in that regard and will not be detailed here.

In S602, receiving the angle of departure (AOD), sent by the receiving terminal, of the sending terminal, where the AOD is determined by the receiving terminal according to the phase information of the angle measuring signals corresponding to the various sending positions; and the phase information of the angle measuring signals is determined by the receiving terminal according to the angle measuring signals.

In the examples of the disclosure, after the sending terminal sends the angle measuring signals to the receiving terminal at the various sending positions, the receiving terminal may determine the phase information of the angle measuring signals according to the angle measuring signals, determines the angle of departure (AOD) of the sending terminal according to the phase information of the angle measuring signals corresponding to the various sending positions, and may send the AOD of the sending terminal to the sending terminal; and further, the sending terminal may receive the AOD, sent by the receiving terminal, of the sending terminal.

In the method for obtaining the angle of departure (AOD) of the terminal according to the examples of the disclosure, the sending terminal may send the angle measuring signals to the receiving terminal at the various sending positions, and receives the AOD, sent by the receiving terminal, of the sending terminal, where the AOD is determined by the receiving terminal according to the phase information of the angle measuring signals corresponding to the various sending positions; and the phase information of the angle measuring signals is determined by the receiving terminal according to the angle measuring signals. Thus, the sending terminal may obtain, by sending the angle measuring signals to the receiving terminal, the AOD of the sending terminal according to AOD, fed back by the receiving terminal, of the sending terminal. In the above solution, the AOD may be obtained in a long term evolution (LTE) network, a new radio (NR) network, and any generation of a proper communication network.

FIG. 9 is a schematic diagram of another method for obtaining an angle of departure (AOD) of a terminal provided by an example of the disclosure.

As shown in FIG. 9, the method for obtaining an angle of departure (AOD) of a terminal according to the example of the present invention includes the following steps S701-S703.

In step S701, grouping the numbers of sending of angle measuring signals, where different antenna spacings are configured for various groups.

In the examples of the disclosure, the sending terminal may group the numbers of sending of angle measuring signals and configure different antenna spacings for various groups.

Optionally, the numbers of sending of angle measuring signals may be grouped according to the actual condition, and different antenna spacings are configured for various groups. For example, in response to the number of sending of angle measuring signals being 10, sending 1-4 may be divided into a group A; sending 5-10 may be divided into a group B; and an antenna spacing configured for the group A is different from that configured for the group B.

In step S702, sending the angle measuring signals to the receiving terminal according to the antenna spacings of the various groups and the numbers of sending distributed to the various groups.

In the examples of the disclosure, after the sending terminal groups the numbers of sending of the angle measuring signals and configures different antenna spacings for the various groups, and the angle measuring signals may be sent to the receiving terminal according to the antenna spacings of the various groups and the numbers of sending distributed to the various groups.

In the examples of the disclosure, the sending terminal may send the angle measuring signals to the receiving terminal at the various sending positions. Optionally, the sending terminal is provided with an antenna array, and may send the angle measuring signals to the receiving terminal at the various sending positions through its own antenna array.

Optionally, the sending terminal may send angle measuring signals at a plurality of different azimuth angles to the receiving terminal. For example, as shown in FIG. 2, the sending terminal may send the angle measuring signals at azimuth angles of 0°, 10°, 20° to 350°; and a difference between the adjacent angle measuring signals in azimuth angle is 10°.

Then in S703, receiving the angle of departure (AOD), sent by the receiving terminal, of the sending terminal for each group, where the AOD is determined by the receiving terminal according to the phase information of the angle measuring signals corresponding to the various sending positions; and the phase information of the angle measuring signals is determined by the receiving terminal according to the angle measuring signals.

In the examples of the disclosure, after the sending terminal sends the angle measuring signals to the receiving terminal according to the antenna spacings of the various groups and the numbers of sending distributed to the various groups, the receiving terminal may determine the angle of departure (AOD) of the sending terminal for each group according to the phase information of the angle measuring signals corresponding to the various sending positions, and may send the AOD of the sending terminal for each group to the sending terminal. Further, the sending terminal may receive the AOD, sent by the receiving terminal, of the sending terminal for each group.

It is to be understood that, as the positions of the sending terminal and the receiving terminal may be changed, the AOD of the sending terminal may also be changed. Optionally, the receiving terminal may further configure a number of repeated sending of the angle measuring signals for each group, so that the receiving terminal may redetermine the phase information of the angle measuring signals and the AOD of the sending terminal for each group according the angle measuring signal sent by the sending terminal for many times, which is conducive to updating the AOD of the sending terminal timely, where the number of repeated sending may include a number of repeated sending in each group using one antenna; and the AOD for each group may be an AOD average value obtained based on the number of repeated sending.

Optionally, after the sending terminal receives the AOD, sent by the receiving terminal, of the sending terminal for each group, the AOD of the sending terminal may further be obtained according to the AOD of the sending terminal for each group. For example, the AOD of the sending terminal may be an average value of the AODs of the sending terminal of all the groups.

In the method for obtaining the angle of departure (AOD) of the terminal according to the examples of the disclosure, the sending terminal may group the numbers of sending of the angle measuring signals, configures different antenna spacings for various groups, sends the angle measuring signals to the receiving terminal, and may receive the AOD, sent by the receiving terminal, of the sending terminal for each group, where the AOD is determined by the receiving terminal according to the phase information of the angle measuring signals corresponding to the various sending positions; and the phase information of the angle measuring signals is determined by the receiving terminal according to the angle measuring signals. Thus, the sending terminal may group the angle measuring signals sent to the receiving terminal, and obtain the AOD of the sending terminal according to the AOD, fed back by the receiving terminal, of the sending terminal for each group.

Figure 10:
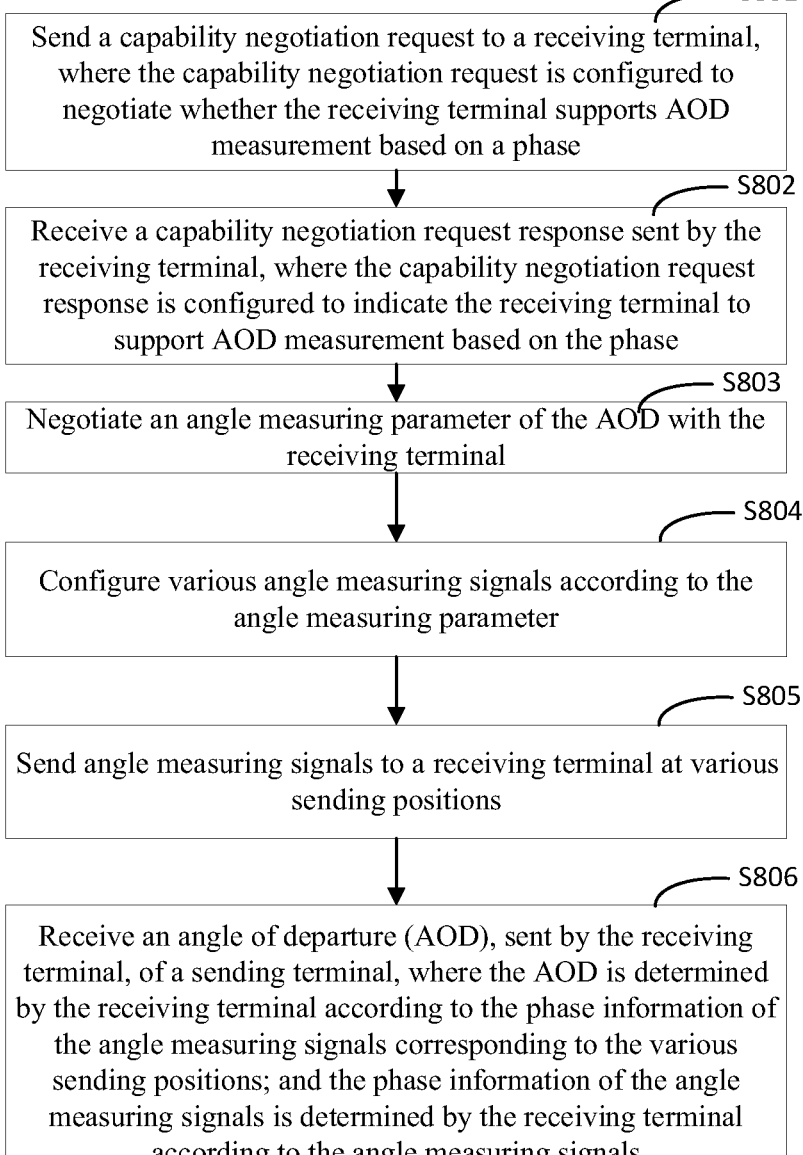
FIG. 10 is a flowchart of another method for obtaining an angle of departure (AOD) of a terminal provided by an example of the disclosure.

FIG. 10 is a schematic diagram of another method for obtaining an angle of departure (AOD) of a terminal provided by an example of the disclosure. As shown in FIG. 10, the method for obtaining an angle of departure (AOD) of a terminal according to the example of the present invention includes the following steps of making the sending terminal determine whether to support AOD measurement based on a phase with the receiving terminal.

In some implementations, the above steps may be initiated by the sending terminal; that is, the method includes steps S801 and S802.

S801, sending a capability negotiation request to a receiving terminal, where the capability negotiation request is configured to negotiate whether the receiving terminal supports AOD measurement based on a phase.

In the examples of the disclosure, before the sending terminal sends the angle measuring signals to the receiving terminal at the various sending positions, the sending terminal may send the capability negotiation request to the receiving terminal, where the capability negotiation request is configured to negotiate whether the receiving terminal supports AOD measurement based on the phase.

S802, receiving a capability negotiation request response sent by the receiving terminal, where the capability negotiation request response is configured to indicate the receiving terminal to support AOD measurement based on the phase.

In the examples of the disclosure, the sending terminal may receive a capability negotiation request response sent by the receiving terminal, and the capability negotiation request response indicates the receiving terminal to support AOD measurement based on the phase, which shows that the method for obtaining the angle of departure (AOD) of the terminal in the examples of the disclosure may be applied to the receiving terminal; and following steps S803-S806 may be continued to be executed.

As another possible implementation, the capability negotiation request response indicates the receiving terminal does not support AOD measurement based on the phase, which shows that the method for obtaining the angle of departure (AOD) of the terminal in the examples of the disclosure cannot be applied to the receiving terminal; and there is no need for continuing to execute following steps S803-S806.

Optionally, the capability negotiation request may be sent or the capability negotiation request response may be received through the terminal capability enquiry sidelink (user equipment capability enquiry sidelink) or the terminal capability information sidelink (user equipment capability information sidelink).

In another some implementations, the above steps may be initiated by the receiving terminal; that is, the method includes: receiving a capability negotiation request sent by the receiving terminal, where the capability negotiation request is configured to negotiate whether the sending terminal supports AOD measurement based on the phase; and sending a capability negotiation request response to the receiving terminal, where the capability negotiation request response indicates the sending terminal to support AOD measurement based on the phase.

In the examples of the disclosure, the sending terminal performs capability negotiation with the receiving terminal; and in response to both the sending terminal and the receiving terminal supporting AOD measurement based on the phase, following steps S803-S806 are continued to be executed.

As another possible implementation, the sending terminal performs capability negotiation with the receiving terminal; and in response to any one of the sending terminal and the receiving terminal not supporting AOD measurement based on the phase, following steps S803-S806 are not continued to be executed.

In S803, negotiating an angle measuring parameter of the AOD with the receiving terminal, where the angle measuring parameter at least includes: an antenna spacing configured by the sending terminal.

S804, configuring various angle measuring signals according to the angle measuring parameter.

S805, sending angle measuring signals to a receiving terminal at various sending positions.

S806, Receiving the angle of departure (AOD), sent by the receiving terminal, of the sending terminal, where the AOD is determined by the receiving terminal according to the phase information of the angle measuring signals corresponding to the various sending positions; and the phase information of the angle measuring signals is determined by the receiving terminal according to the angle measuring signals.

In the examples of the disclosure, step S803, step S804, step S805 and step S806 may be implemented using any one in various examples of the disclosure; and the examples of the disclosure are not limited in that regard and will not be detailed here.

In the examples of the disclosure, after the sending terminal sends the angle measuring signals to the receiving terminal at the various sending positions, the receiving terminal may determine the phase information of the angle measuring signals according to the angle measuring signals, determines the angle of departure (AOD) of the sending terminal according to the phase information of the angle measuring signals corresponding to the various sending positions, and may send the AOD of the sending terminal to the sending terminal. Further, the sending terminal may receive the AOD, sent by the receiving terminal, of the sending terminal.

In the method for obtaining the angle of departure (AOD) of the terminal according to the examples of the disclosure, the sending terminal negotiates whether to support AOD measurement based on the phase with the receiving terminal, may negotiate the angle measuring parameter of the AOD with the receiving terminal, and configures the various angle measuring signals in response to reaching into the angle measuring period of triggering angle measurement each time; and the sending terminal may send the angle measuring signals to the receiving terminal at the various sending positions, and may receive the AOD, sent by the receiving terminal, of the sending terminal, where the AOD is determined by the receiving terminal according to the phase information of the angle measuring signals corresponding to the various sending positions; and the phase information of the angle measuring signals is determined by the receiving terminal according to the angle measuring signals. Thus, the sending terminal may obtain, by sending the angle measuring signals to the receiving terminal, the AOD of the sending terminal according to AOD, fed back by the receiving terminal, of the sending terminal.

Figure 11:
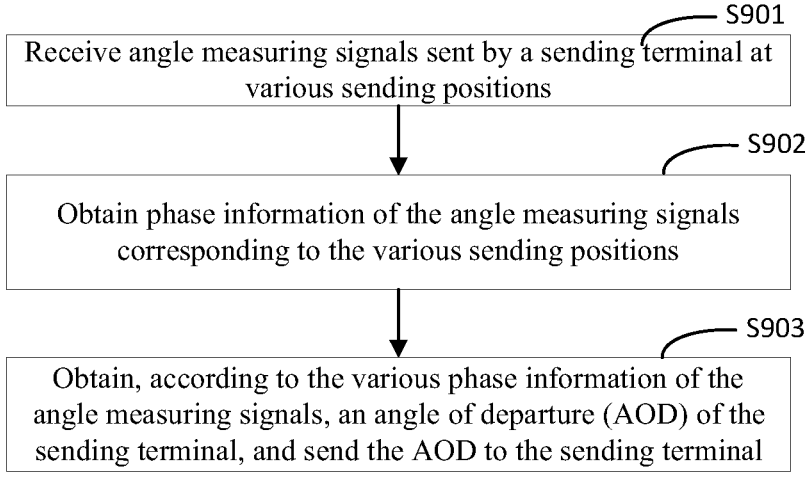
FIG. 11 is a flowchart of another method for obtaining an angle of departure (AOD) of a terminal provided by an example of the disclosure.

FIG. 11 is a schematic diagram of another method for obtaining an angle of departure (AOD) of a terminal provided by an example of the disclosure.

As shown in FIG. 11, the method for obtaining an angle of departure (AOD) of a terminal according to the example of the present invention includes the following steps S901-S903.

In S901, receiving the angle measuring signals sent by the sending terminal at the various sending positions In S902, phase information of the angle measuring signals corresponding to the various sending positions is obtained.

In S903, obtaining, according to the various phase information of the angle measuring signals, the angle of departure (AOD) of the sending terminal, and sending the AOD to the sending terminal.

Optionally, the receiving terminal may send, in response to reaching into the sending period of the AOD each time, the AOD to the sending terminal, where the sending period of the AOD may be set according to the actual condition, for example, may be set as 10 minutes.

Optionally, in response to grouping the numbers of sending of the angle measuring signals by the sending terminal, obtaining the AOD of the sending terminal according to the various phase information of the angle measuring signals may include: obtaining, by performing AOD calculation based on an antenna spacing configured for the group and the phase information of the angle measuring signals corresponding to the group, the AOD of the sending terminal corresponding to the group for any group. Thus, the receiving terminal may obtain the AOD, corresponding to the angle measuring signals of each group, of the sending terminal.

Optionally, in response to configuring a number of repeated sending for each group, obtaining the AOD of the sending terminal according to the various phase information of the angle measuring signals may include: obtaining, by performing AOD calculation based on the antenna spacing configured for the group and the corresponding phase information of the angle measuring signals, obtained each repetition, of the group, a plurality of AODs corresponding to the group for any group; and obtaining an average value of the plurality of AODs corresponding to the group as an AOD, corresponding to the group, of the sending terminal. Thus, the receiving terminal may obtain the AODs, corresponding to the angle measuring signals of each group, of a plurality of sending terminals, and take an average value of the plurality of AODs corresponding to each group as the AOD, corresponding to the group, of the sending terminal.

In the examples of the disclosure, step S901, step S902 and step S903 may be implemented using any one in various examples of the disclosure; and the examples of the disclosure are not limited in that regard and will not be detailed here.

In the method for obtaining the angle of departure (AOD) of the terminal according to the examples of the disclosure, the receiving terminal may receive the angle measuring signals sent by the sending terminal at the various sending positions, may obtain the phase information of the angle measuring signals corresponding to the various sending positions, obtains the AOD of the sending terminal according to the various phase information of the angle measuring signals, and sends the AOD to the sending terminal. Thus, the receiving terminal may determine the AOD of the sending terminal according to the various phase information of the angle measuring signals.

FIG. 12 is a schematic diagram of another method for obtaining an angle of departure (AOD) of a terminal provided by an example of the disclosure.

As shown in FIG. 12, the method for obtaining an angle of departure (AOD) of a terminal according to the example of the present invention includes the following steps of making the receiving terminal determine whether to support AOD measurement based on the phase with the sending terminal.

In some implementations, the above steps may be initiated by the sending terminal; that is, the method includes steps S1001 and S1002. In S1001, the capability negotiation request is received by the sending terminal, where the capability negotiation request is configured to negotiate whether the receiving terminal supports AOD measurement based on a phase.

In the examples of the disclosure, before the receiving terminal receives the angle measuring signals sent by the sending terminal at the various sending positions, the receiving terminal may receive the capability negotiation request sent by the sending terminal, where the capability negotiation request is configured to negotiate whether the receiving terminal supports AOD measurement based on the phase.

In step S1002, sending a capability negotiation request response to the sending terminal, where the capability negotiation request response is configured to indicate to the receiving terminal that it supports AOD measurement based on a phase.

In the examples of the disclosure, the receiving terminal may send the capability negotiation request response to the sending terminal, and the capability negotiation request response indicates the receiving terminal to support AOD measurement based on the phase, which shows that the method for obtaining the angle of departure (AOD) of the terminal in the examples of the disclosure may be applied to the receiving terminal; and following steps S1003-S1007 may be continued to be executed.

As another possible implementation, the capability negotiation request response indicates the receiving terminal does not support AOD measurement based on the phase, which shows that the method for obtaining the angle of departure (AOD) of the terminal in the examples of the disclosure cannot be applied to the receiving terminal; and there is no need for continuing to execute following steps S1003-S1007.

Optionally, the capability negotiation request may be received or the capability negotiation request response may be sent through the terminal capability enquiry sidelink (user equipment capability enquiry sidelink) or the terminal capability information sidelink (user equipment capability information sidelink).

In another some implementations, the above steps may be initiated by the receiving terminal; that is, the method includes: receiving a capability negotiation request sent by the receiving terminal, where the capability negotiation request is configured to negotiate whether the sending terminal supports AOD measurement based on the phase; and sending a capability negotiation request response to the receiving terminal, where the capability negotiation request response indicates the sending terminal to support AOD measurement based on the phase.

In the examples of the disclosure, the sending terminal performs capability negotiation with the receiving terminal; and in response to both the sending terminal and the receiving terminal supporting AOD measurement based on the phase, following steps S1003-S1007 are continued to be executed.

As another possible implementation, the sending terminal performs capability negotiation with the receiving terminal; and in response to any one of the sending terminal and the receiving terminal not supporting AOD measurement based on the phase, following steps S1003-S1007 are not continued to be executed.

In step S1003, negotiating the angle measuring parameter of the AOD with the sending terminal, where the angle measuring parameter at least includes: an antenna spacing configured by the sending terminal.

In step S1004, the angle measuring signals sent by the sending terminal at the various sending positions is received.

In step S1005, phase information of the angle measuring signals corresponding to the various sending positions is obtained.

In step S1006, sending time of two angle measuring signals at adjacent sending positions is obtained, and the phase information of the angle measuring signals based on a difference between the two sending time is modified.

In step S1007, according to the various phase information of the angle measuring signals, the angle of departure (AOD) of the sending terminal is obtained, and the AOD is sent to the sending terminal.

In the examples of the disclosure, step S1003, step S1004, step S1005, step S1006, and step S1007 may be implemented using any one in various examples of the disclosure; and the examples of the disclosure are not limited in that regard and will not be detailed here.

In the method for obtaining the angle of departure (AOD) of the terminal according to the examples of the disclosure, the receiving terminal may negotiate whether to support AOD measurement based on a phase with the sending terminal, may negotiates the angle measuring parameter of the AOD with the sending terminal, may receive the angle measuring signals sent by the sending terminal at the various sending positions, obtains the phase information of the angle measuring signals corresponding to the various sending positions, may further obtain the sending time of the two angle measuring signals at adjacent sending positions, modifies the phase information of the angle measuring signals based on a difference between the two sending time, obtains the AOD of the sending terminal according to the various phase information of the angle measuring signals, and sends the AOD to the sending terminal. Thus, the receiving terminal may determine the AOD of the sending terminal according to the various phase information of the angle measuring signals.

Figure 13:
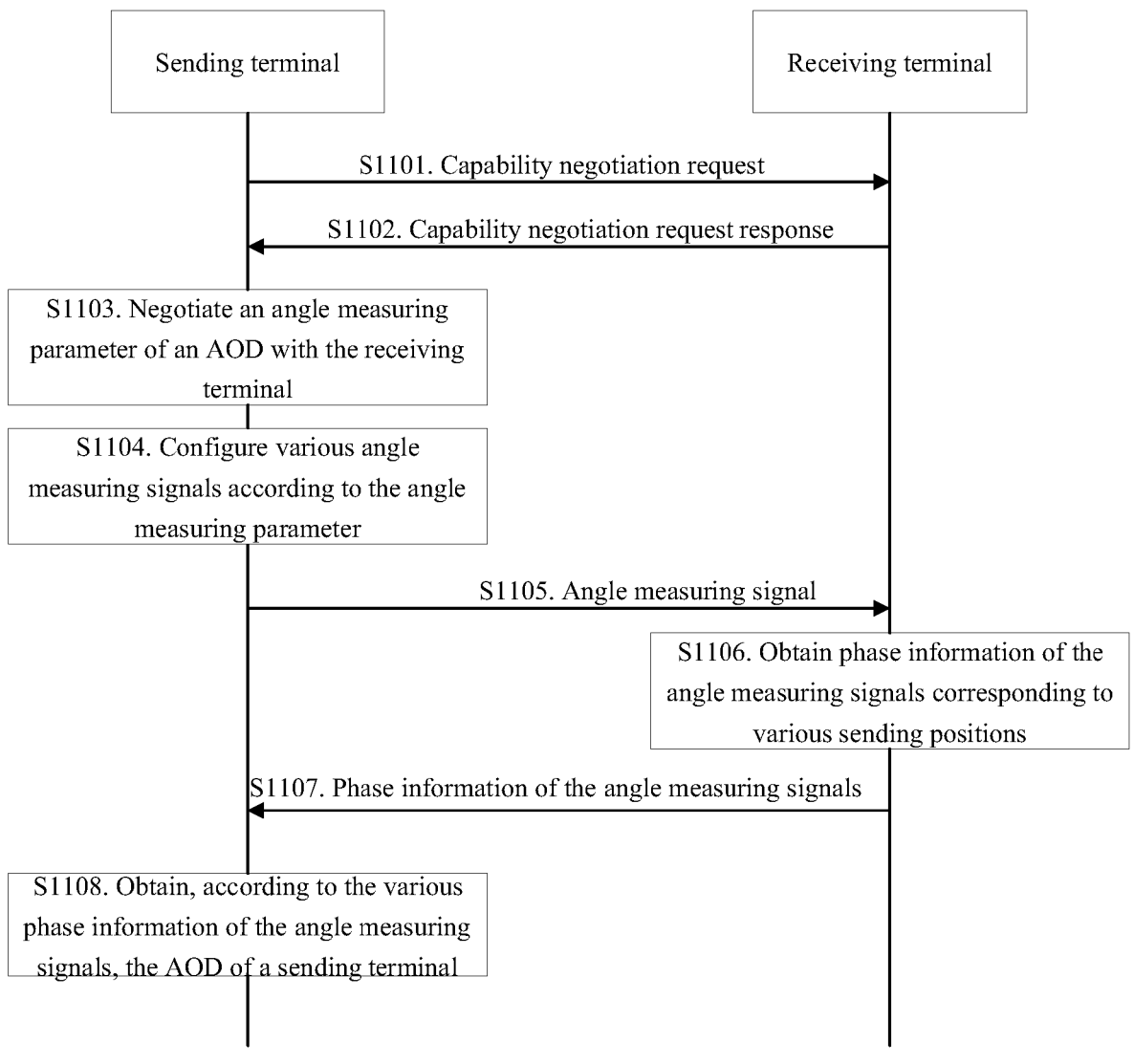
FIG. 13 is an interaction schematic diagram of a method for obtaining an angle of departure (AOD) of a terminal provided by an example of the disclosure.

FIG. 13 is an interaction schematic diagram of a method for obtaining an angle of departure (AOD) of a terminal provided by an example of the disclosure. As shown in FIG. 13, the method for obtaining an angle of departure (AOD) of a terminal according to the example of the present invention includes the following steps.

S1101, sending a capability negotiation request by the sending terminal to a receiving terminal, where the capability negotiation request is configured to negotiate whether the receiving terminal supports AOD measurement based on a phase.

S1102, sending a capability negotiation request response by the receiving terminal to the sending terminal, where the capability negotiation request response is configured to indicate whether the receiving terminal supports AOD measurement based on a phase.

In the examples of the disclosure, the receiving terminal may send the capability negotiation request response to the sending terminal, and the capability negotiation request response indicates the receiving terminal to support AOD measurement based on the phase, which shows that the method for obtaining the angle of departure (AOD) of the terminal in the examples of the disclosure may be applied to the receiving terminal; and following steps S1103-S1108 may be continued to be executed.

As another possible implementation, the capability negotiation request response indicates that the receiving terminal not to support AOD measurement based on the phase, which shows that the method for obtaining the angle of departure (AOD) of the terminal in the examples of the disclosure cannot be applied to the receiving terminal; and there is no need for continuing to execute following steps S1103-S1108.

At step S1103, the sending terminal is made to negotiate an angle measuring parameter of the AOD with the receiving terminal.

At step S1104, various angle measuring signals are configured by the sending terminal according to the angle measuring parameter.

At step S1105, angle measuring signals are sent by the sending terminal to the receiving terminal at various sending positions.

At step S1106, the receiving terminal is made to obtain phase information of the angle measuring signals corresponding to the various sending positions.

At step S1107, the various phase information of the angle measuring signals are sent by the receiving terminal to the sending terminal.

At step S1108, the sending terminal is made to obtain, according to the various phase information of the angle measuring signals, the angle of departure (AOD) of the sending terminal.

In the examples of the disclosure, step S1101, step S1102, step S1103, step S1104, step S1105, step S1106, step S1107, and step S1108 may be implemented using any one in various examples of the disclosure; and the examples of the disclosure are not limited in that regard and will not be detailed here.

In the method for obtaining the angle of departure (AOD) of the terminal according to the examples of the disclosure, the sending terminal negotiates whether to support AOD measurement based on the phase with the receiving terminal, may also negotiate the angle measuring parameter of the AOD with the receiving terminal, and configures the various angle measuring signals in response to reaching into the angle measuring period of triggering angle measurement each time; and the sending terminal may send the angle measuring signals to the receiving terminal at the various sending positions, may receive the corresponding phase information of the angle measuring signals, sent by the receiving terminal, of the various sending positions, and may obtain the AOD of the sending terminal according to the various phase information of the angle measuring signals. Thus, the sending terminal may determine, by sending the angle measuring signals to the receiving terminal, the AOD of the sending terminal according to the phase information of the angle measuring signals fed back by the receiving terminal.

Figure 14:
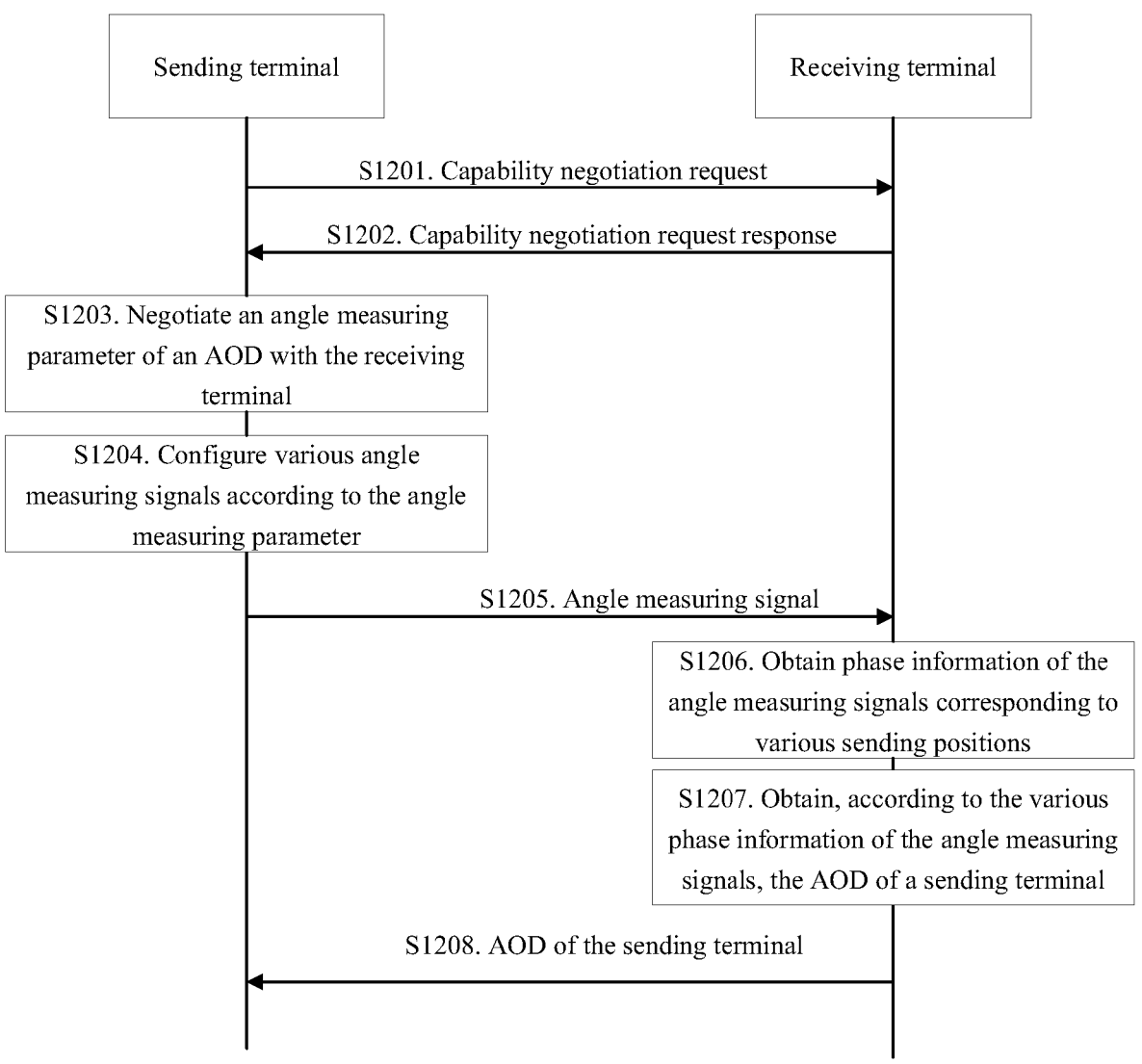
FIG. 14 is an interaction schematic diagram of another method for obtaining an angle of departure (AOD) of a terminal provided by an example of the disclosure.

FIG. 14 is an interaction schematic diagram of another method for obtaining an angle of departure (AOD) of a terminal provided by an example of the disclosure. As shown in FIG. 14, the method for obtaining an angle of departure (AOD) of a terminal according to the example of the present invention includes the following steps In step S1201, a capability negotiation request is sent by the sending terminal to a receiving terminal, where the capability negotiation request is configured to negotiate whether the receiving terminal supports AOD measurement based on a phase.

At step S1202, a capability negotiation request response is sent by the receiving terminal to the sending terminal, where the capability negotiation request response is configured to indicate whether the receiving terminal supports AOD measurement based on a phase.

In the examples of the disclosure, the receiving terminal may send the capability negotiation request response to the sending terminal, and the capability negotiation request response indicates the receiving terminal to support AOD measurement based on the phase, which shows that the method for obtaining the angle of departure (AOD) of the terminal in the examples of the disclosure may be applied to the receiving terminal; and following steps S1203-S1207 may be continued to be executed.

As another possible implementation, the capability negotiation request response indicates the receiving terminal does not support AOD measurement based on the phase, which shows that the method for obtaining the angle of departure (AOD) of the terminal in the examples of the disclosure cannot be applied to the receiving terminal; and there is no need for continuing to execute following steps S1203-S1207.

At step S1203, the sending terminal is made to negotiate an angle measuring parameter of the AOD with the receiving terminal.

At step S1204, various angle measuring signals is configured by the sending terminal according to the angle measuring parameter.

At step S1205, angle measuring signals is sent by the sending terminal to the receiving terminal at various sending positions.

At step S1206, the receiving terminal is made to obtain phase information of the angle measuring signals corresponding to the various sending positions.

At step S1207, the receiving terminal is made to obtain, according to the various phase information of the angle measuring signals, the angle of departure (AOD) of the sending terminal.

In the examples of the disclosure, step S1201, step S1202, step S1203, step S1204, step S1205, step S1206, and step S1207 may be implemented using any one in various examples of the disclosure; and the examples of the disclosure are not limited in that regard and will not be detailed here.

In the method for obtaining the angle of departure (AOD) of the terminal according to the examples of the disclosure, the sending terminal negotiates whether to support AOD measurement based on the phase with the receiving terminal, may negotiate the angle measuring parameter of the AOD with the receiving terminal, and configures the various angle measuring signals in response to reaching into the angle measuring period of triggering angle measurement each time. The sending terminal may send the angle measuring signals to the receiving terminal at the various sending positions, and may receive the AOD, sent by the receiving terminal, of the sending terminal, where the AOD is determined by the receiving terminal according to the phase information of the angle measuring signals corresponding to the various sending positions; and the phase information of the angle measuring signals is determined by the receiving terminal according to the angle measuring signals. Thus, the sending terminal may obtain, by sending the angle measuring signals to the receiving terminal, the AOD of the sending terminal according to AOD, fed back by the receiving terminal, of the sending terminal.

In the examples of the disclosure, direct communication between devices is supported in a long term evolution (LTE) network, a new radio (NR) and other communication networks. The devices may directly communicate with each other based on a sidelink technology; a sidelink interface between two terminals is called a PC5 interface; the PC5 interface supports two protocols, including a radio resource control (RRC) protocol corresponding to PC5 (a PC5-RRC protocol), and a signaling protocol corresponding to PC5 (a PC5-S protocol). The PC5 interface supports broadcast, multicast, unicast, and other communication modes.

In response to establishing communication between a terminal A and a terminal B through a unicast communication mode via the PC5 interface, the terminal A and the terminal B may both determine own target identifications used for receiving; a vehicle wireless communication (vehicle to everything, V2X) application layer of the terminal A may provide a service type of V2X application to the PC5 protocol layer; then, the terminal A may send an indication information request (direct communication request) to the terminal B; the terminal B may feed a security establishment message back to the terminal A; then, the terminal A and the terminal B both perform security establishment; then, the terminal A may send Internet protocol (IP) address configuration information to the terminal B; the terminal B may feed an indication information acceptance (direct communication accept) message back to the terminal A; and finally, the terminal A and the terminal B may both provide a PC5 interface identification to an application server (AS), so as to establish communication between the terminal A and the terminal B.

Figure 15:
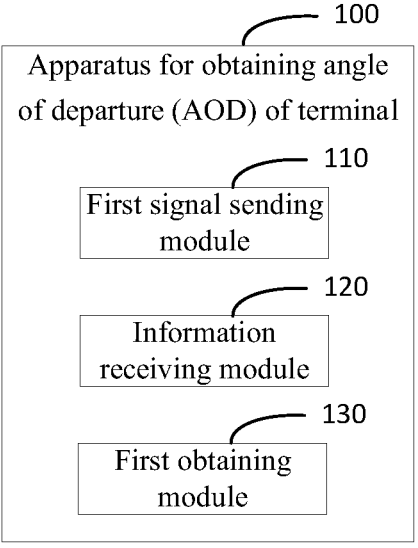
FIG. 15 is a schematic structural diagram of an apparatus for obtaining an angle of departure (AOD) of a terminal provided by an example of the disclosure.
Figure 16:
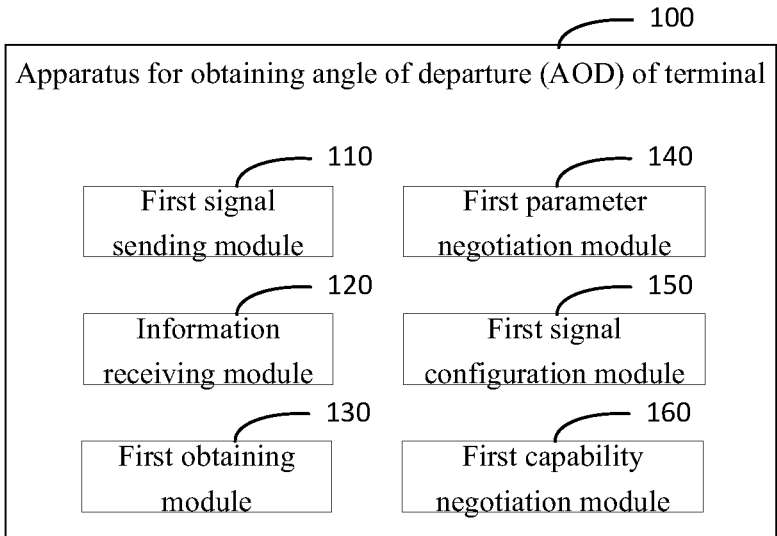
FIG. 16 is a schematic structural diagram of another apparatus for obtaining an angle of departure (AOD) of a terminal provided by an example of the disclosure.

Corresponding to the method for obtaining the angle of departure (AOD) of the terminal provided by the above several examples, the disclosure further provides an apparatus for obtaining an angle of departure (AOD) of a terminal. As the apparatus for obtaining the angle of departure (AOD) of the terminal provided by the examples of the disclosure corresponds to the method for obtaining the angle of departure (AOD) of the terminal provided by the examples in FIGS. 1-5, the implementation of the method for obtaining the angle of departure (AOD) of the terminal is also suitable for the apparatus for obtaining the angle of departure (AOD) of the terminal provided by this example, which will not be described in detail in this example anymore. FIGS. 15-16 are schematic structural diagrams of an apparatus for obtaining an angle of departure (AOD) of a terminal provided by the disclosure.

FIG. 15 is a schematic structural diagram of an apparatus for obtaining an angle of departure (AOD) of a terminal 100 provided by an example of the disclosure. As shown in FIG. 15, the apparatus 100 for obtaining the angle of departure (AOD) of the terminal includes: a first signal sending module 110, an information receiving module 120, and a first obtaining module 130. The first signal sending module 110 is configured to send angle measuring signals to a receiving terminal at various sending positions.

The information receiving module 120 is configured to receive corresponding phase information of the angle measuring signals, sent by the receiving terminal, of the various sending positions. The first obtaining module 130 is configured to obtain, according to the various phase information of the angle measuring signals, the AOD of a sending terminal.

Optionally, the first signal sending module 110 is further configured to: send the angle measuring signals to the receiving terminal for many times at the various sending positions.

Optionally, the first signal sending module 110 is further configured to: send the angle measuring signals to the receiving terminal according to preset numbers of sending corresponding to the various sending positions; or periodically send the angle measuring signals to the receiving terminal at the various sending positions according to a sending period.

Optionally, as shown in FIG. 16, the apparatus 100 for obtaining the angle of departure (AOD) of the terminal further includes: a first parameter negotiation module 140, configured to, before the angle measuring signals are sent to the receiving terminal at the various sending positions, negotiate an angle measuring parameter of the AOD with the receiving terminal using one of following modes: an angle measuring request is sent to the receiving terminal, where the angle measuring request carries the angle measuring parameter; or an angle measuring request response sent by the receiving terminal is received, where the angle measuring request response carries the angle measuring parameter; or resource scheduling information is sent to the receiving terminal, where the resource scheduling information includes the angle measuring parameter; or negotiation indicating information is sent to the receiving terminal, where the negotiation indicating information carries the angle measuring parameter.

Optionally, the angle measuring parameter includes: one or more of the sending period, the number of sending and a sending duration per sending for the angle measuring signals, a sending period for the phase information of the angle measuring signals, an angle measuring type and an angle measuring period of triggering angle measurement.

Optionally, as shown in FIG. 16, the apparatus 100 for obtaining the angle of departure (AOD) of the terminal further includes: a first signal configuration module 150, configured to, configure, in response to reaching into the angle measuring period of triggering angle measurement each time, the various angle measuring signals according to the angle measuring parameter before the various angle measuring signals are sent to the receiving terminal.

Optionally, as shown in FIG. 16, the apparatus 100 for obtaining the angle of departure (AOD) of the terminal further includes: a first capability negotiation module 160, configured to send a capability negotiation request to the receiving terminal before the angle measuring signals are sent to the receiving terminal at the various sending positions, where the capability negotiation request is configured to negotiate whether the receiving terminal supports AOD measurement based on a phase; and receive a capability negotiation request response sent by the receiving terminal, where the capability negotiation request response is configured to indicate whether the receiving terminal supports AOD measurement based on the phase.

Optionally, the first capability negotiation module 160 is further configured to send the capability negotiation request or receive the capability negotiation request response through a terminal capability enquiry sidelink or a terminal capability information sidelink.

The apparatus for obtaining the angle of departure (AOD) of the terminal according to the examples of the disclosure may send the angle measuring signals to the receiving terminal at the various sending positions, may receive the corresponding phase information of the angle measuring signals, sent by the receiving terminal, of the various sending positions, and may obtain the AOD of the sending terminal according to the various phase information of the angle measuring signals. Thus, the AOD of the sending terminal may be determined by sending the angle measuring signals to the receiving terminal according to the phase information of the angle measuring signals fed back by the receiving terminal.

Figure 17:
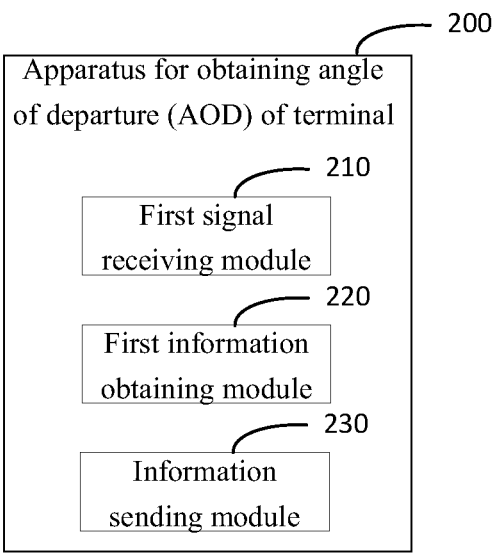
FIG. 17 is a schematic structural diagram of another apparatus for obtaining an angle of departure (AOD) of a terminal provided by an example of the disclosure.
Figure 18:
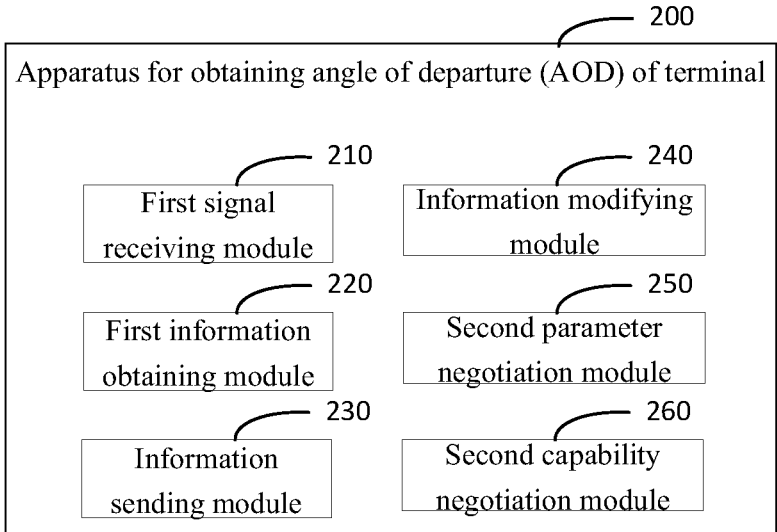
FIG. 18 is a schematic structural diagram of another apparatus for obtaining an angle of departure (AOD) of a terminal provided by an example of the disclosure.

Corresponding to the method for obtaining the angle of departure (AOD) of the terminal provided by the above several examples, the disclosure further provides an apparatus for obtaining an angle of departure (AOD) of a terminal. As the apparatus for obtaining the angle of departure (AOD) of the terminal provided by the examples of the disclosure corresponds to the method for obtaining the angle of departure (AOD) of the terminal provided by the examples in FIGS. 6-7, the implementation of the method for obtaining the angle of departure (AOD) of the terminal is also suitable for the apparatus for obtaining the angle of departure (AOD) of the terminal provided by this example, which will not be described in detail in this example anymore. FIGS. 17-18 are schematic structural diagrams of an apparatus for obtaining an angle of departure (AOD) of a terminal provided by the disclosure.

FIG. 17 is a schematic structural diagram of an apparatus for obtaining an angle of departure (AOD) of a terminal 200 provided by an example of the disclosure. As shown in FIG. 17, the apparatus 200 for obtaining the angle of departure (AOD) of the terminal includes: a first signal receiving module 210, a first information obtaining module 220 and an information sending module 230.

The first signal receiving module 210, configured to receive angle measuring signals sent by a sending terminal at various sending positions. The first information obtaining module 220, configured to obtain phase information of the angle measuring signals corresponding to the various sending positions. The information sending module 230, configured to send the various phase information of the angle measuring signals to the sending terminal.

Optionally, the first signal receiving module 210 is further configured to receive the angle measuring signals sent by the sending terminal for many times at the various sending positions.

Optionally, the information sending module 230 is further configured to send, in response to reaching into a sending period of the phase information of the angle measuring signals each time, the various phase information of the angle measuring signals to the sending terminal.

Optionally, as shown in FIG. 18, the apparatus 200 for obtaining the angle of departure (AOD) of the terminal further includes: an information modifying module 240, configured to obtain, after phase information of the angle measuring signals corresponding to the various sending positions is obtained, sending time of two angle measuring signals at adjacent sending positions, and modify the phase information of the angle measuring signals based on a difference between the two sending time.

Optionally, as shown in FIG. 18, the apparatus 200 for obtaining the angle of departure (AOD) of the terminal further includes: a second parameter negotiation module 250, configured to, before the angle measuring signals sent by the sending terminal at the various sending positions are received, negotiate an angle measuring parameter of the AOD with the sending terminal using one of following negotiation modes: an angle measuring request sent by the sending terminal is received, where the angle measuring request carries the angle measuring parameter; or an angle measuring request response is sent to the sending terminal, where the angle measuring request response carries the angle measuring parameter; or resource scheduling information sent by the sending terminal is received, where the resource scheduling information includes the angle measuring parameter; or negotiation indicating information sent by the sending terminal is received, where the negotiation indicating information carries the angle measuring parameter.

Optionally, the angle measuring parameter includes: one or more of the sending period, the number of sending and a sending duration per sending for the angle measuring signals, a sending period for the phase information of the angle measuring signals, an angle measuring type and an angle measuring period of triggering angle measurement.

Optionally, as shown in FIG. 18, the apparatus 200 for obtaining the angle of departure (AOD) of the terminal further includes: a second capability negotiation module 260, configured to receive the capability negotiation request sent by the sending terminal before the angle measuring signals sent by the sending terminal at the various sending positions are received, where the capability negotiation request is configured to negotiate whether the receiving terminal supports AOD measurement based on a phase; and send the capability negotiation request response to the sending terminal, where the capability negotiation request response is configured to indicate whether the receiving terminal supports AOD measurement based on the phase.

Optionally, the second capability negotiation module 260 is further configured to receive the capability negotiation request or send the capability negotiation request response through a terminal capability enquiry sidelink or a terminal capability information sidelink.

The apparatus for obtaining the angle of departure (AOD) of the terminal according to the examples of the disclosure may receive the angle measuring signals sent by the sending terminal at the various sending positions, may obtain the phase information of the angle measuring signals corresponding to the various sending positions, and sends the various phase information of the angle measuring signals to the sending terminal. Thus, the various phase information of the angle measuring signals may be sent to the sending terminal, for the sending terminal determining the AOD of the sending terminal according to the phase information of the angle measuring signals.

Figure 19:
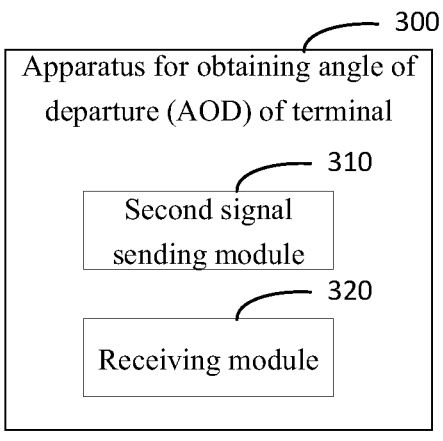
FIG. 19 is a schematic structural diagram of another apparatus for obtaining an angle of departure (AOD) of a terminal provided by an example of the disclosure.
Figure 20:
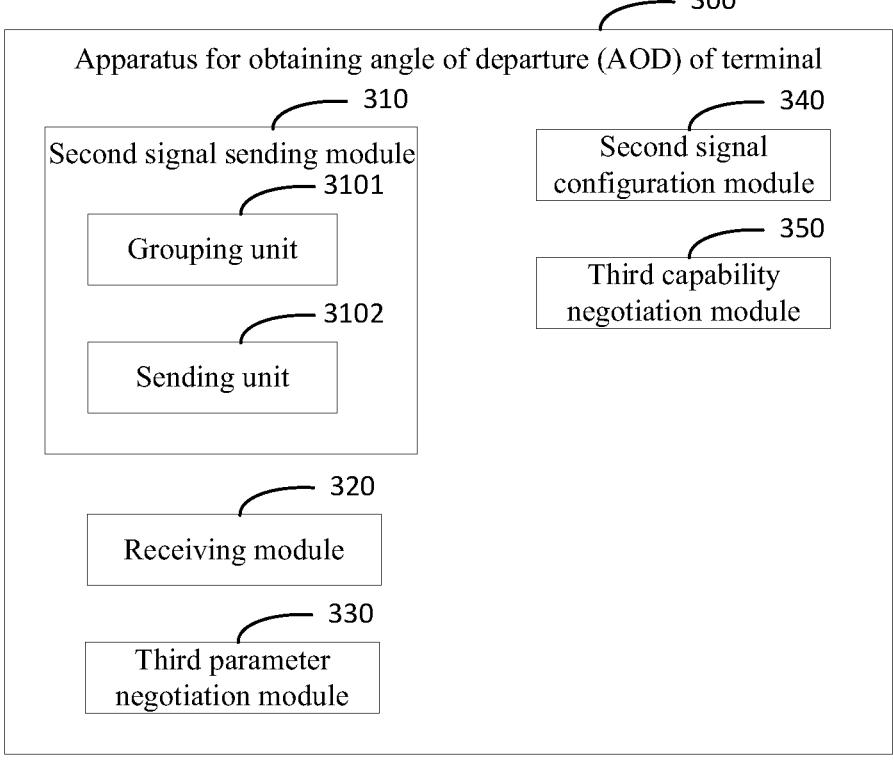
FIG. 20 is a schematic structural diagram of another apparatus for obtaining an angle of departure (AOD) of a terminal provided by an example of the disclosure.

Corresponding to the method for obtaining the angle of departure (AOD) of the terminal provided by the above several examples, the disclosure further provides a apparatus for obtaining an angle of departure (AOD) of a terminal. As the apparatus for obtaining the angle of departure (AOD) of the terminal provided by the examples of the disclosure corresponds to the method for obtaining the angle of departure (AOD) of the terminal provided by the examples in FIGS. 8-10, the implementation of the method for obtaining the angle of departure (AOD) of the terminal is also suitable for the apparatus for obtaining the angle of departure (AOD) of the terminal provided by this example, which will not be described in detail in this example any more. FIGS. 19-20 are schematic structural diagrams of an apparatus for obtaining an angle of departure (AOD) of a terminal provided by the disclosure.

FIG. 19 is a schematic structural diagram of an apparatus for obtaining an angle of departure (AOD) of a terminal 300 provided by an example of the disclosure. As shown in FIG. 19, the apparatus 300 for obtaining the angle of departure (AOD) of the terminal includes: a second signal sending module 310 and a receiving module 320.

The second signal sending module 310 is configured to send angle measuring signals to a receiving terminal at various sending positions. The receiving module 320 is configured to receive the AOD, sent by the receiving terminal, of a sending terminal, where the AOD is determined by the receiving terminal according to the phase information of the angle measuring signals corresponding to the various sending positions; and the phase information of the angle measuring signals is determined by the receiving terminal according to the angle measuring signals.

Optionally, as shown in FIG. 20, the second signal sending module 310 includes: a grouping unit 3101, configured to group the numbers of sending of the angle measuring signals, where different antenna spacings are configured for various groups; and a sending unit 3102, configured to send the angle measuring signals to the receiving terminal according to the antenna spacings of the various groups and the numbers of sending distributed to the various groups.

Optionally, the receiving module 320 is further configured to receive the AOD, sent by the receiving terminal, of each group.

Optionally, the grouping unit 3101 is further configured to configure a number of repeated sending of angle measuring signals for each group, where the AOD of each group is an AOD average value obtained based on the number of repeated sending.

Optionally, as shown in FIG. 20, the apparatus 300 for obtaining the angle of departure (AOD) of the terminal further includes: a third parameter negotiation module 330, configured to, before the angle measuring signals are sent to the receiving terminal at the various sending positions, negotiate an angle measuring parameter of the AOD with the receiving terminal using one of following modes: an angle measuring request is sent to the receiving terminal, where the angle measuring request carries the angle measuring parameter; or an angle measuring request response sent by the receiving terminal is received, where the angle measuring request response carries the angle measuring parameter; or resource scheduling information is sent to the receiving terminal, where the resource scheduling information includes the angle measuring parameter; or negotiation indicating information is sent to the receiving terminal, where the negotiation indicating information carries the angle measuring parameter, where the angle measuring parameter at least includes: an antenna spacing configured by the sending terminal.

Optionally, the angle measuring parameter further includes: one or more of the sending period, the number of sending and a sending duration per sending for the angle measuring signals, a sending period for the phase information of the angle measuring signals, an angle measuring type and an angle measuring period of triggering angle measurement.

Optionally, as shown in FIG. 20, the apparatus 300 for obtaining the angle of departure (AOD) of the terminal further includes: a second signal configuration module 340, configured to, configure, in response to reaching into the angle measuring period of triggering angle measurement each time, the various angle measuring signals according to the angle measuring parameter before the various angle measuring signals are sent to the receiving terminal.

Optionally, as shown in FIG. 20, the apparatus 300 for obtaining the angle of departure (AOD) of the terminal further includes: a third capability negotiation module 350, configured to send a capability negotiation request to the receiving terminal before the angle measuring signals are sent to the receiving terminal at the various sending positions, where the capability negotiation request is configured to negotiate whether the receiving terminal supports AOD measurement based on a phase; and receive a capability negotiation request response sent by the receiving terminal, where the capability negotiation request response is configured to indicate whether the receiving terminal supports AOD measurement based on the phase.

Optionally, the third capability negotiation module 350 is further configured to send the capability negotiation request or receive the capability negotiation request response through a terminal capability enquiry sidelink or a terminal capability information sidelink.

The apparatus for obtaining the angle of departure (AOD) of the terminal according to the examples of the disclosure may send the angle measuring signals to the receiving terminal at the various sending positions, and may receive the AOD, sent by the receiving terminal, of the sending terminal, where the AOD is determined by the receiving terminal according to the phase information of the angle measuring signals corresponding to the various sending positions; and the phase information of the angle measuring signals is determined by the receiving terminal according to the angle measuring signals. Thus, the AOD of the sending terminal may be obtained, by sending the angle measuring signals to the receiving terminal, according to the AOD, fed back by the receiving terminal, of the sending terminal.

Figure 21:
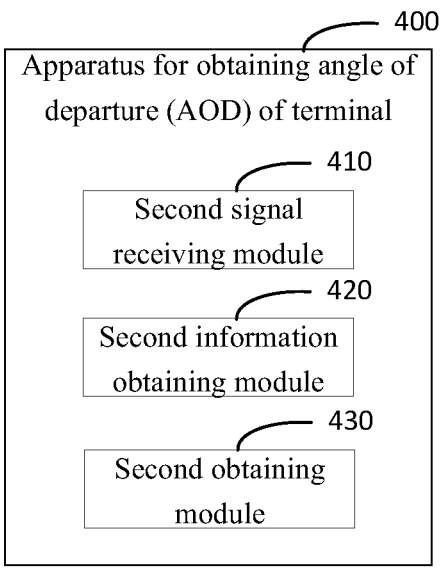
FIG. 21 is a schematic structural diagram of another apparatus for obtaining an angle of departure (AOD) of a terminal provided by an example of the disclosure.
Figure 22:
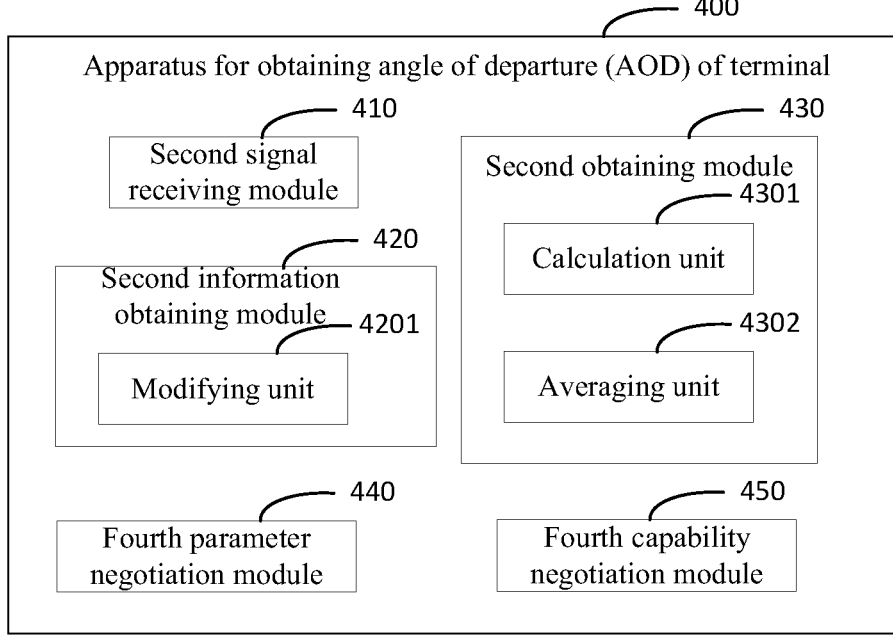
FIG. 22 is a schematic structural diagram of another apparatus for obtaining an angle of departure (AOD) of a terminal provided by an example of the disclosure.

Corresponding to the method for obtaining the angle of departure (AOD) of the terminal provided by the above several examples, the disclosure further provides an apparatus for obtaining an angle of departure (AOD) of a terminal. As the apparatus for obtaining the angle of departure (AOD) of the terminal provided by the examples of the disclosure corresponds to the method for obtaining the angle of departure (AOD) of the terminal provided by the examples in FIGS. 11-12, the implementation of the method for obtaining the angle of departure (AOD) of the terminal is also suitable for the apparatus for obtaining the angle of departure (AOD) of the terminal provided by this example, which will not be described in detail in this example anymore. FIGS. 21-22 are schematic structural diagrams of an apparatus for obtaining an angle of departure (AOD) of a terminal provided by the disclosure.

FIG. 21 is a schematic structural diagram of an apparatus for obtaining an angle of departure (AOD) of a terminal 400 provided by an example of the disclosure. As shown in FIG. 21, the apparatus 400 for obtaining the angle of departure (AOD) of the terminal includes: a second signal receiving module 410, a second information obtaining module 420, and a second obtaining module 430.

The second signal receiving module 410 is configured to receive angle measuring signals sent by a sending terminal at various sending positions. The second information obtaining module 420 is configured to obtain phase information of the angle measuring signals corresponding to the various sending positions. The second obtaining module 430 is configured to obtain, according to the various phase information of the angle measuring signals, the AOD of the sending terminal, and send the AOD to the sending terminal.

Optionally, in response to grouping the numbers of sending of the angle measuring signals by the sending terminal, the second obtaining module 430 is further configured to: obtain, by performing AOD calculation based on an antenna spacing configured for the group and the phase information of the angle measuring signals corresponding to the group, the AOD of the sending terminal corresponding to the group for any group.

Optionally, in response to configuring a number of repeated sends for each group, as shown in FIG. 22, the second obtaining module 430 includes: a calculation unit 4301, configured to obtain, by performing AOD calculation based on the antenna spacing configured for the group and the corresponding phase information of the angle measuring signals, obtained each repetition, of the group, a plurality of AODs corresponding to the group for any group; and an averaging unit 4302, configured to obtain an average value of the plurality of AODs corresponding to the group as an AOD, corresponding to the group, of the sending terminal.

Optionally, the second obtaining module 430 is further configured to send, in response to reaching a sending period of the AOD each time, the AOD to the sending terminal.

Optionally, as shown in FIG. 22, the second information obtaining module 420 in apparatus 400 includes: a modifying unit 4201, configured to obtain sending time of two angle measuring signals at adjacent sending positions, and modify the phase information of the angle measuring signals based on a difference between the two sending times.

Optionally, as shown in FIG. 22, the apparatus 400 for obtaining the angle of departure (AOD) of the terminal further includes: a fourth parameter negotiation module 440, configured to, before the angle measuring signals sent by the sending terminal at the various sending positions are received, negotiate an angle measuring parameter of the AOD with the sending terminal using one of following negotiation modes: an angle measuring request sent by the sending terminal is received, where the angle measuring request carries the angle measuring parameter; or an angle measuring request response is sent to the sending terminal, where the angle measuring request response carries the angle measuring parameter; or resource scheduling information sent by the sending terminal is received, where the resource scheduling information includes the angle measuring parameter; or negotiation indicating information sent by the sending terminal is received, where the negotiation indicating information carries the angle measuring parameter, where the angle measuring parameter at least includes: an antenna spacing configured by the sending terminal.

Optionally, the angle measuring parameter further includes: one or more of the sending period, the number of sending and a sending duration per sending for the angle measuring signals, a sending period for the phase information of the angle measuring signals, an angle measuring type and an angle measuring period of triggering angle measurement.

Optionally, as shown in FIG. 22, the apparatus 400 for obtaining the angle of departure (AOD) of the terminal further includes: a fourth capability negotiation module 450, configured to receive the capability negotiation request sent by the sending terminal before the angle measuring signals sent by the sending terminal at the various sending positions are received, where the capability negotiation request is configured to negotiate whether the receiving terminal supports AOD measurement based on a phase; and send the capability negotiation request response to the sending terminal, where the capability negotiation request response is configured to indicate whether the receiving terminal supports AOD measurement based on the phase.

Optionally, the fourth capability negotiation module 450 is further configured to receive the capability negotiation request or send the capability negotiation request response through a terminal capability enquiry sidelink or a terminal capability information sidelink.

The apparatus for obtaining the angle of departure (AOD) of the terminal according to the examples of the disclosure may receive the angle measuring signals sent by the sending terminal at the various sending positions, may obtain the phase information of the angle measuring signals corresponding to the various sending positions, obtains the AOD of the sending terminal according to the various phase information of the angle measuring signals, and sends the AOD to the sending terminal. Thus, the AOD of the sending terminal may be determined according to the various phase information of the angle measuring signals.

According to the examples of the present disclosure, the present disclosure further provides a communication device and a readable storage medium.

Figure 23:
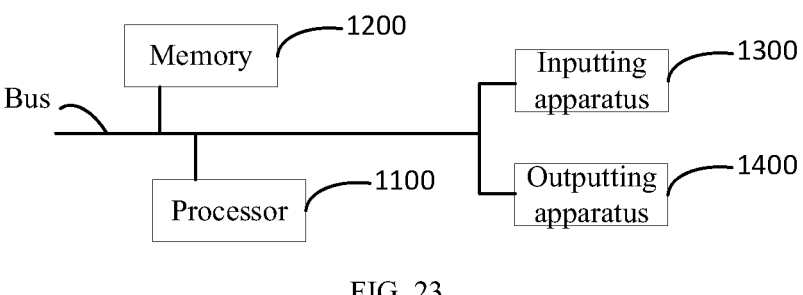
FIG. 23 is a schematic diagram of a communication device provided by an example of the disclosure.

As shown in FIG. 23 is a block diagram of a communication device according to an example of the disclosure. The communication device is intended to represent various forms of digital computers, such as a laptop computer, a desktop computer, a workstation, a personal digital assistant, a server, a blade server, a mainframe computer, and other suitable computers. The communication device may further represent various forms of mobile apparatuses, such as the personal digital assistant, a cellular phone, a smartphone, a wearable device, and other similar computing apparatuses. The components shown herein, their connections and relationships, and their functions are merely examples, and are not intended to limit the implementation of the disclosure described and/or required herein.

As shown in FIG. 23, the communication device includes: one or more processors 1100, a memory 1200, and an interface configured to connect various components and including a high-speed interface and a low-speed interface. The various components are interconnected using different buses, and may be mounted on a common motherboard or in other manners if needed. The processor may process instructions executed in the communication device, and includes instructions stored in the memory or on the memory to display graphical information for a GUI on an external inputting/outputting apparatus (such as a display device coupled to the interface). In other implementations, a plurality of processors and/or a plurality of buses may be used, as appropriate, along with a plurality of memories and types of memory. Also, a plurality of communication devices may be connected, with each device providing portions of the necessary operations (for example, as a server bank, a group of blade servers, or a multi-processor system). In FIG. 23, one processor 1100 is taken as an example.

The memory 1200 is a non-transitory computer readable storage medium provided by the disclosure, where the memory stores instructions executable by at least one processor, so as to cause the at least one processor to perform the method for obtaining the angle of departure (AOD) of the terminal provided by the disclosure. The non-transitory computer readable storage medium provided by the disclosure stores computer instructions, and the computer instructions are used to cause a computer to perform the method for obtaining the angle of departure (AOD) of the terminal provided by the disclosure.

As the non-transitory computer readable storage medium, the memory 1200 may be used to store non-transitory software programs, non-transitory computer executable programs and modules, such as program instructions/modules (for example, the first signal sending module 110, the information receiving module 120 and the first obtaining module 130 as shown in FIG. 15) corresponding to the method for obtaining the angle of departure (AOD) of the terminal in the examples of the disclosure. The processor 1100 performs a variety of functions, applications, and data processing of a server by running the non-transitory software programs, instructions, and modules stored in the memory 1200, so as to implement the method for obtaining the angle of departure (AOD) of the terminal in the above method examples.

The memory 1200 may include a program storage area and a data storage area, where the program storage area may store an operating system and at least one application program required by at least one function. The data storage area may store data created according to use of a positioning communication device, etc. In addition, the memory 1200 may include a high-speed random access memory, and may further include a non-transitory memory such as at least one disk memory device, a flash memory device, or other non-transitory solid-state memories. Optionally, the memory 1200 alternatively includes the memories remotely located from the processor 1100, and these remote memories may be connected to the positioning communication device through a network. An instance of the above network includes, but is not limited to: the Internet, an intranet, a local-area-network, a mobile communication network, or a combination thereof.

The communication device may further include: an inputting apparatus 1300 and an outputting apparatus 1400. The processor 1100, the memory 1200, the inputting apparatus 1300, and the outputting apparatus 1400 may be connected with each other through buses or other means. In FIG. 23, the bus connection is taken as an example.

The inputting apparatus 1300 may receive input digital or character information, and generate a key input signal related to a user setting and function control of the positioning communication device; for example, a touch screen, a keypad, a mouse, a trackpad, a touch tablet, an indicating arm, one or more mouse buttons, a trackball, a joy stick or other inputting apparatuses. The outputting apparatus 1400 may include a display device, an auxiliary lighting apparatus (for example, an LED), a tactile feedback apparatus (for example, a vibration motor), and the like. The display device may include, but is not limited to: a liquid crystal display (LCD), a light-emitting diode (LED) display, and a plasma display. In some implementations, the display device may be the touch screen.

Various implementations of the systems and technologies described herein can be implemented in a digital electronic circuit system, an integrated circuit system, an application-specific integrated circuit (ASIC), computer hardware, firmware, software, and/or a combination thereof. These various implementations may include: implementation in one or more computer programs that are executable and/or interpretable on a programmable system including at least one programmable processor, which may be special or general purpose, coupled to receive data and instructions from, and to transmit data and instructions to, a storage system, at least one inputting apparatus, and at least one outputting apparatus.

These computer programs (also known as programs, software, software applications, or codes) include machine instructions for a programmable processor, and may be implemented in a high-level procedural and/or object-oriented programming language, and/or in assembly/machine language. As used herein, the terms "machine-readable medium" and "computer-readable medium" refer to any computer program product, device and/or apparatus (for example, a magnetic disc, an optical disk, memory, a programmable logic device (PLD)) used to provide machine instructions and/or data to the programmable processor, including the machine-readable medium that receives the machine instructions as machine-readable signals. The term "machine-readable signal" refers to any signal used to provide the machine instructions and/or data to the programmable processor.

To provide for interaction with a user, the systems and technologies described here can be implemented on the computer having the display device (for example, a cathode ray tube (CRT) or liquid crystal display (LCD) monitor) for displaying information to the user; and a keyboard and a pointing apparatus (for example, the mouse or the trackball) by which the user can provide input to the computer. Other kinds of apparatuses may be used to provide for interaction with the user as well; for example, feedback provided to the user may be any form of sensory feedback (for example, visual feedback, auditory feedback, or tactile feedback), and input from the user may be received in any form, including acoustic, speech, or tactile input.

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. An example of the communication network includes: the local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

In the method for obtaining the angle of departure (AOD) of the terminal according to the examples of the disclosure, the sending terminal may send the angle measuring signals to the receiving terminal at the various sending positions, may receive the corresponding phase information of the angle measuring signals, sent by the receiving terminal, of the various sending positions, and may obtain the AOD of the sending terminal according to the various phase information of the angle measuring signals. Thus, the sending terminal may determine, by sending the angle measuring signals to the receiving terminal, the AOD of the sending terminal according to the phase information of the angle measuring signals fed back by the receiving terminal. In the above solution, the AOD may be obtained in a long term evolution (LTE) network, new radio (NR) network, and any generation of a proper communication network.

It should be understood that steps may be reordered, added, or deleted based on the various forms of procedures shown above. For example, the steps recorded in the disclosure may be performed concurrently, in order, or in a different order, provided that the desired result of the technical solutions disclosed in the disclosure can be achieved, which is not limited herein.

The above specific implementations are not to be construed as limiting the scope of the disclosure. It should be understood by those skilled in the art that various modifications, combinations, sub-combinations and alterations may occur depending on design requirements and other factors. Any modification, equivalent replacement, improvement, etc., made within the spirit and principles of the disclosure shall be included in the protection scope of the disclosure.

In the first aspect of the disclosure, a method for obtaining an angle of departure (AOD) of a terminal is provided, including: sending angle measuring signals to a receiving terminal at various sending positions; receiving corresponding phase information of the angle measuring signals, sent by the receiving terminal, of the various sending positions; and obtaining the AOD of the sending terminal according to the various phase information of the angle measuring signals.

Alternatively, the sending angle measuring signals to a receiving terminal at various sending positions includes: sending the angle measuring signals to the receiving terminal for many times at the various sending positions.

Alternatively, the sending the angle measuring signals to the receiving terminal for many times at the various sending positions includes: sending the angle measuring signals to the receiving terminal according to preset numbers corresponding to sending at the various sending positions; or periodically sending the angle measuring signals to the receiving terminal at the various sending positions according to a sending period.

Alternatively, before the sending the angle measuring signals to the receiving terminal at the various sending positions, the method further includes: negotiating an angle measuring parameter of the AOD with the receiving terminal using one of following modes: sending an angle measuring request to the receiving terminal, where the angle measuring request carries the angle measuring parameter; or receiving an angle measuring request response sent by the receiving terminal, where the angle measuring request response carries the angle measuring parameter; or sending resource scheduling information to the receiving terminal, where the resource scheduling information includes the angle measuring parameter; or sending negotiation indicating information to the receiving terminal, where the negotiation indicating information carries the angle measuring parameter.

Alternatively, the angle measuring parameter includes: one or more of the sending period, the number of sending and a sending duration per sending for the angle measuring signals, a sending period for the phase information of the angle measuring signals, an angle measuring type and an angle measuring period of triggering angle measurement.

Alternatively, the method further includes: before sending the various angle measuring signals to the receiving terminal, in response to reaching into the angle measuring period of triggering angle measurement each time, configuring the various angle measuring signals according to the angle measuring parameter.

Alternatively, before the sending the angle measuring signals to the receiving terminal at the various sending positions, the method further includes: sending a capability negotiation request to the receiving terminal, where the capability negotiation request is configured to negotiate whether the receiving terminal supports AOD measurement based on a phase; and receiving a capability negotiation request response sent by the receiving terminal, where the capability negotiation request response is configured to indicate whether the receiving terminal supports AOD measurement based on the phase.

Alternatively, the capability negotiation request is sent or the capability negotiation request response is received through a terminal capability enquiry sidelink or a terminal capability information sidelink.

In the second aspect of the disclosure, another method for obtaining an angle of departure (AOD) of a terminal is provided, including: receiving angle measuring signals sent by a sending terminal at various sending positions; obtaining phase information of the angle measuring signals corresponding to the various sending positions; and sending the various phase information of the angle measuring signals to the sending terminal.

Alternatively, the receiving angle measuring signals sent by a sending terminal at various sending positions includes: receiving the angle measuring signals sent by the sending terminal for many times at the various sending positions.

Alternatively, the sending the various phase information of the angle measuring signals to the sending terminal includes: sending, in response to reaching into a sending period of the phase information of the angle measuring signals each time, the various phase information of the angle measuring signals to the sending terminal.

Alternatively, after the obtaining phase information of the angle measuring signals corresponding to the various sending positions, the method further includes: obtaining sending time of two angle measuring signals at adjacent sending positions, and modifying the phase information of the angle measuring signals based on a difference between the two sending time.

Alternatively, before the receiving angle measuring signals sent by a sending terminal at various sending positions, the method further includes: negotiating an angle measuring parameter of the AOD with the sending terminal using one of following negotiation modes: receiving an angle measuring request sent by the sending terminal, where the angle measuring request carries the angle measuring parameter; or sending an angle measuring request response to the sending terminal, where the angle measuring request response carries the angle measuring parameter; or receiving resource scheduling information sent by the sending terminal, where the resource scheduling information includes the angle measuring parameter; or receiving negotiation indicating information sent by the sending terminal, where the negotiation indicating information carries the angle measuring parameter.

Alternatively, the angle measuring parameter includes: one or more of the sending period, the number of sending and a sending duration per sending for the angle measuring signals, a sending period for the phase information of the angle measuring signals, an angle measuring type and an angle measuring period of triggering angle measurement.

Alternatively, before the receiving angle measuring signals sent by a sending terminal at various sending positions, the method further includes: receiving a capability negotiation request sent by the sending terminal, where the capability negotiation request is configured to negotiate whether the receiving terminal supports AOD measurement based on the phase; and sending a capability negotiation request response to the sending terminal, where the capability negotiation request response is configured to indicate whether the receiving terminal supports AOD measurement based on the phase.

Alternatively, the capability negotiation request is received or the capability negotiation request response is sent through a terminal capability enquiry sidelink or a terminal capability information sidelink.

In the third aspect of the disclosure, another method for obtaining an angle of departure (AOD) of a terminal is provided, including: sending angle measuring signals to a receiving terminal at various sending positions; and receiving the AOD, sent by the receiving terminal, of a sending terminal, where the AOD is determined by the receiving terminal according to the phase information of the angle measuring signals corresponding to the various sending positions; and the phase information of the angle measuring signals is determined by the receiving terminal according to the angle measuring signals.

Alternatively, the sending angle measuring signals to a receiving terminal at various sending positions includes: grouping the numbers of sending of the angle measuring signals, where different antenna spacings are configured for various groups; and sending the angle measuring signals to the receiving terminal according to the antenna spacings of the various groups and the numbers of sending distributed to the various groups.

Alternatively, receiving the AOD, sent by the receiving terminal, of a sending terminal includes: receiving the AOD, sent by the receiving terminal, of each group.

Alternatively, the method further includes: configuring a number of repeated sending of angle measuring signals for each group, where the AOD of each group is an AOD average value obtained based on the number of repeated sending.

Alternatively, before the sending the angle measuring signals to the receiving terminal at the various sending positions, the method further includes: negotiating an angle measuring parameter of the AOD with the receiving terminal using one of following modes: sending an angle measuring request to the receiving terminal, where the angle measuring request carries the angle measuring parameter; or receiving an angle measuring request response sent by the receiving terminal, where the angle measuring request response carries the angle measuring parameter; or sending resource scheduling information to the receiving terminal, where the resource scheduling information includes the angle measuring parameter; or sending negotiation indicating information to the receiving terminal, where the negotiation indicating information carries the angle measuring parameter, where the angle measuring parameter at least includes: an antenna spacing configured by the sending terminal.

Alternatively, the angle measuring parameter further includes: one or more of the sending period, the number of sending and a sending duration per sending for the angle measuring signals, a sending period for the phase information of the angle measuring signals, an angle measuring type and an angle measuring period of triggering angle measurement.

Alternatively, before the sending the various angle measuring signals to the receiving terminal, the method further includes: in response to reaching into the angle measuring period of triggering angle measurement each time, configuring the various angle measuring signals according to the angle measuring parameter.

Alternatively, before the sending the angle measuring signals to the receiving terminal at the various sending positions, the method further includes: sending a capability negotiation request to the receiving terminal, where the capability negotiation request is configured to negotiate whether the receiving terminal supports AOD measurement based on a phase; and receiving a capability negotiation request response sent by the receiving terminal, where the capability negotiation request response is configured to indicate whether the receiving terminal supports AOD measurement based on the phase.

Alternatively, the capability negotiation request is sent or the capability negotiation request response is received through a terminal capability enquiry sidelink or a terminal capability information sidelink.

In the fourth aspect of the disclosure, another method for obtaining an angle of departure (AOD) of a terminal is provided, including: receiving angle measuring signals sent by a sending terminal at various sending positions; obtaining phase information of the angle measuring signals corresponding to the various sending positions; and obtaining, according to the various phase information of the angle measuring signals, the AOD of the sending terminal, and sending the AOD to the sending terminal.

Alternatively, in response to grouping the numbers of sending of the angle measuring signals by the sending terminal, obtaining the AOD of the sending terminal according to the various phase information of the angle measuring signals includes: obtaining, by performing AOD calculation based on an antenna spacing configured for the group and the phase information of the angle measuring signals corresponding to the group, the AOD of the sending terminal corresponding to the group for any group.

Alternatively, in response to configuring a number of repeated sending for each group, obtaining the AOD of the sending terminal according to the various phase information of the angle measuring signals includes: obtaining, by performing AOD calculation based on the antenna spacing configured for the group and the corresponding phase information of the angle measuring signals, obtained each repetition, of the group, a plurality of AODs corresponding to the group for any group; and obtaining an average value of the plurality of AODs corresponding to the group as an AOD, corresponding to the group, of the sending terminal.

Alternatively, the method further includes: sending, in response to reaching into a sending period of the AOD each time, the AOD to the sending terminal.

Alternatively, the obtaining phase information of the angle measuring signals corresponding to the various sending positions includes: obtaining sending time of two angle measuring signals at adjacent sending positions, and modifying the phase information of the angle measuring signals based on a difference between the two sending time.

Alternatively, before the receiving angle measuring signals sent by a sending terminal at various sending positions, the method further includes: negotiating an angle measuring parameter of the AOD with the sending terminal using one of following negotiation modes: receiving an angle measuring request sent by the sending terminal, where the angle measuring request carries the angle measuring parameter; or sending an angle measuring request response to the sending terminal, where the angle measuring request response carries the angle measuring parameter; or receiving resource scheduling information sent by the sending terminal, where the resource scheduling information includes the angle measuring parameter; or receiving negotiation indicating information sent by the sending terminal, where the negotiation indicating information carries the angle measuring parameter. where the angle measuring parameter at least includes: an antenna spacing configured by the sending terminal.

Alternatively, the angle measuring parameter further includes: one or more of the sending period, the number of sending and a sending duration per sending for the angle measuring signals, a sending period for the phase information of the angle measuring signals, an angle measuring type and an angle measuring period of triggering angle measurement.

Alternatively, before the receiving angle measuring signals sent by a sending terminal at various sending positions, the method further includes: receiving a capability negotiation request sent by the sending terminal, where the capability negotiation request is configured to negotiate whether the receiving terminal supports AOD measurement based on the phase; and sending a capability negotiation request response to the sending terminal, where the capability negotiation request response is configured to indicate whether the receiving terminal supports AOD measurement based on the phase.

Alternatively, the capability negotiation request is received or the capability negotiation request response is sent through a terminal capability enquiry sidelink or a terminal capability information sidelink.

In the fifth aspect of the disclosure, an apparatus for obtaining an angle of departure (AOD) of a terminal is provided, including: a first signal sending module, configured to send angle measuring signals to a receiving terminal at various sending positions; an information receiving module, configured to receive corresponding phase information of the angle measuring signals, sent by the receiving terminal, of the various sending positions; and a first obtaining module, configured to obtain, according to the various phase information of the angle measuring signals, the AOD of a sending terminal.

Alternatively, the first signal sending module is further configured to: send the angle measuring signals to the receiving terminal for many times at the various sending positions.

Alternatively, the first signal sending module is further configured to: send the angle measuring signals to the receiving terminal according to preset numbers of sending corresponding to the various sending positions; or periodically send the angle measuring signals to the receiving terminal at the various sending positions according to a sending period.

Alternatively, the apparatus for obtaining the angle of departure (AOD) of the terminal further includes: a first parameter negotiation module, configured to, before the angle measuring signals are sent to the receiving terminal at the various sending positions, negotiate an angle measuring parameter of the AOD with the receiving terminal using one of following modes: an angle measuring request is sent to the receiving terminal, where the angle measuring request carries the angle measuring parameter; or an angle measuring request response sent by the receiving terminal is received, where the angle measuring request response carries the angle measuring parameter; or resource scheduling information is sent to the receiving terminal, where the resource scheduling information includes the angle measuring parameter; or negotiation indicating information is sent to the receiving terminal, where the negotiation indicating information carries the angle measuring parameter.

Alternatively, the angle measuring parameter includes: one or more of the sending period, the number of sending and a sending duration per sending for the angle measuring signals, a sending period for the phase information of the angle measuring signals, an angle measuring type and an angle measuring period of triggering angle measurement.

Alternatively, the apparatus for obtaining the angle of departure (AOD) of the terminal further includes: a first signal configuration module, configured to, configure, in response to reaching into the angle measuring period of triggering angle measurement each time, the various angle measuring signals according to the angle measuring parameter before the various angle measuring signals are sent to the receiving terminal.

Alternatively, the apparatus for obtaining the angle of departure (AOD) of the terminal further includes: a first capability negotiation module, configured to send a capability negotiation request to the receiving terminal before the angle measuring signals are sent to the receiving terminal at the various sending positions, where the capability negotiation request is configured to negotiate whether the receiving terminal supports AOD measurement based on the phase; and receive a capability negotiation request response sent by the receiving terminal, where the capability negotiation request response is configured to indicate whether the receiving terminal supports AOD measurement based on the phase.

Alternatively, the first capability negotiation module is further configured to send the capability negotiation request or receive the capability negotiation request response through a terminal capability enquiry sidelink or a terminal capability information sidelink.

In the sixth aspect of the disclosure, another apparatus for obtaining an angle of departure (AOD) of a terminal is provided, including: a first signal receiving module, configured to receive angle measuring signals sent by a sending terminal at various sending positions; a first information obtaining module, configured to obtain phase information of the angle measuring signals corresponding to the various sending positions; and an information sending module, configured to send the various phase information of the angle measuring signals to the sending terminal.

Alternatively, the first signal receiving module is further configured to receive the angle measuring signals sent by the sending terminal for many times at the various sending positions.

Alternatively, the information sending module is further configured to send, in response to reaching into a sending period of the phase information of the angle measuring signals each time, the various phase information of the angle measuring signals to the sending terminal.

Alternatively, the apparatus for obtaining the angle of departure (AOD) of the terminal further includes: an information modifying module, configured to obtain, after phase information of the angle measuring signals corresponding to the various sending positions is obtained, sending time of two angle measuring signals at adjacent sending positions, and modify the phase information of the angle measuring signals based on a difference between the two sending time.

Alternatively, the apparatus for obtaining the angle of departure (AOD) of the terminal further includes: a second parameter negotiation module, configured to, before the angle measuring signals sent by the sending terminal at the various sending positions are received, negotiate an angle measuring parameter of the AOD with the sending terminal using one of following negotiation modes: an angle measuring request sent by the sending terminal is received, where the angle measuring request carries the angle measuring parameter; or an angle measuring request response is sent to the sending terminal, where the angle measuring request response carries the angle measuring parameter; or resource scheduling information sent by the sending terminal is received, where the resource scheduling information includes the angle measuring parameter; or negotiation indicating information sent by the sending terminal is received, where the negotiation indicating information carries the angle measuring parameter.

Alternatively, the angle measuring parameter includes: one or more of the sending period, the number of sending and a sending duration per sending for the angle measuring signals, a sending period for the phase information of the angle measuring signals, an angle measuring type and an angle measuring period of triggering angle measurement.

Alternatively, the apparatus for obtaining the angle of departure (AOD) of the terminal further includes: a second capability negotiation module, configured to receive the capability negotiation request sent by the sending terminal before the angle measuring signals sent by the sending terminal at the various sending positions are received, where the capability negotiation request is configured to negotiate whether the receiving terminal supports AOD measurement based on a phase; and send the capability negotiation request response to the sending terminal, where the capability negotiation request response is configured to indicate whether the receiving terminal supports AOD measurement based on the phase.

Alternatively, the second capability negotiation module is further configured to receive the capability negotiation request or send the capability negotiation request response through a terminal capability enquiry sidelink or a terminal capability information sidelink.

In the seventh aspect of the disclosure, another apparatus for obtaining an angle of departure (AOD) of a terminal is provided, including: a second signal sending module, configured to send angle measuring signals to a receiving terminal at various sending positions; and a receiving module, configured to receive the AOD, sent by the receiving terminal, of a sending terminal, where the AOD is determined by the receiving terminal according to the phase information of the angle measuring signals corresponding to the various sending positions; and the phase information of the angle measuring signals is determined by the receiving terminal according to the angle measuring signals.

Alternatively, the second signal sending module includes: a grouping unit, configured to group the numbers of sending of the angle measuring signals, where different antenna spacings are configured for various groups; and a sending unit, configured to send the angle measuring signals to the receiving terminal according to the antenna spacings of the various groups and the numbers of sending distributed to the various groups.

Alternatively, the receiving module is further configured to receive the AOD, sent by the receiving terminal, of each group.

Alternatively, the grouping unit is further configured to configure a number of repeated sending of angle measuring signals for each group, where the AOD of each group is an AOD average value obtained based on the number of repeated sending.

Alternatively, the apparatus for obtaining the angle of departure (AOD) of the terminal further includes: a third parameter negotiation module, configured to, before the angle measuring signals are sent to the receiving terminal at the various sending positions, negotiate an angle measuring parameter of the AOD with the receiving terminal using one of following modes: an angle measuring request is sent to the receiving terminal, where the angle measuring request carries the angle measuring parameter; or an angle measuring request response sent by the receiving terminal is received, where the angle measuring request response carries the angle measuring parameter; or resource scheduling information is sent to the receiving terminal, where the resource scheduling information includes the angle measuring parameter; or negotiation indicating information is sent to the receiving terminal, where the negotiation indicating information carries the angle measuring parameter, where the angle measuring parameter at least includes: an antenna spacing configured by the sending terminal.

Alternatively, the angle measuring parameter further includes: one or more of the sending period, the number of sending and a sending duration per sending for the angle measuring signals, a sending period for the phase information of the angle measuring signals, an angle measuring type and an angle measuring period of triggering angle measurement.

Alternatively, the apparatus for obtaining the angle of departure (AOD) of the terminal further includes: a second signal configuration module, configured to, configure, in response to reaching into the angle measuring period of triggering angle measurement each time, the various angle measuring signals according to the angle measuring parameter before the various angle measuring signals are sent to the receiving terminal.

Alternatively, the apparatus for obtaining the angle of departure (AOD) of the terminal further includes: a third capability negotiation module, configured to send a capability negotiation request to the receiving terminal before the angle measuring signals are sent to the receiving terminal at the various sending positions, where the capability negotiation request is configured to negotiate whether the receiving terminal supports AOD measurement based on the phase; and receive a capability negotiation request response sent by the receiving terminal, where the capability negotiation request response is configured to indicate whether the receiving terminal supports AOD measurement based on the phase.

Alternatively, the third capability negotiation module is further configured to send the capability negotiation request or receive the capability negotiation request response through a terminal capability enquiry sidelink or a terminal capability information sidelink.

In the eighth aspect of the disclosure, another apparatus for obtaining an angle of departure (AOD) of a terminal is provided, including: a second signal receiving module, configured to receive angle measuring signals sent by a sending terminal at various sending positions; a second information obtaining module, configured to obtain phase information of the angle measuring signals corresponding to the various sending positions; and a second obtaining module, configured to obtain, according to the various phase information of the angle measuring signals, the AOD of the sending terminal, and send the AOD to the sending terminal.

Alternatively, in response to grouping the numbers of sending of the angle measuring signals by the sending terminal, the second obtaining module is further configured to: obtain, by performing AOD calculation based on an antenna spacing configured for the group and the phase information of the angle measuring signals corresponding to the group, the AOD of the sending terminal corresponding to the group for any group.

Alternatively, in response to configuring a number of repeated sending for each group, the second obtaining module includes: a calculation unit, configured to obtain, by performing AOD calculation based on the antenna spacing configured for the group and the corresponding phase information of the angle measuring signals, obtained each repetition, of the group, a plurality of AODs corresponding to the group for any group; and an averaging unit, configured to obtain an average value of the plurality of AODs corresponding to the group as an AOD, corresponding to the group, of the sending terminal.

Alternatively, the second obtaining module is further configured to send, in response to reaching into a sending period of the AOD each time, the AOD to the sending terminal.

Alternatively, the second information obtaining module includes: a modifying unit, configured to obtain sending time of two angle measuring signals at adjacent sending positions, and modify the phase information of the angle measuring signals based on a difference between the two sending time.

Alternatively, the apparatus for obtaining the angle of departure (AOD) of the terminal further includes: a fourth parameter negotiation module, configured to, before the angle measuring signals sent by the sending terminal at the various sending positions are received, negotiate an angle measuring parameter of the AOD with the sending terminal using one of following negotiation modes: an angle measuring request sent by the sending terminal is received, where the angle measuring request carries the angle measuring parameter; or an angle measuring request response is sent to the sending terminal, where the angle measuring request response carries the angle measuring parameter; or resource scheduling information sent by the sending terminal is received, where the resource scheduling information includes the angle measuring parameter; or negotiation indicating information sent by the sending terminal is received, where the negotiation indicating information carries the angle measuring parameter, where the angle measuring parameter at least includes: an antenna spacing configured by the sending terminal.

Alternatively, the angle measuring parameter further includes: one or more of the sending period, the number of sending and a sending duration per sending for the angle measuring signals, a sending period for the phase information of the angle measuring signals, an angle measuring type and an angle measuring period of triggering angle measurement.

Alternatively, the apparatus for obtaining the angle of departure (AOD) of the terminal further includes: a fourth capability negotiation module, configured to receive the capability negotiation request sent by the sending terminal before the angle measuring signals sent by the sending terminal at the various sending positions are received, where the capability negotiation request is configured to negotiate whether the receiving terminal supports AOD measurement based on the phase; and send the capability negotiation request response to the sending terminal, where the capability negotiation request response is configured to indicate whether the receiving terminal supports AOD measurement based on the phase.

Alternatively, the fourth capability negotiation module is further configured to receive the capability negotiation request or send the capability negotiation request response through a terminal capability enquiry sidelink or a terminal capability information sidelink.

In the ninth aspect of the disclosure, the examples provide a communication device, including: at least one processor; and a memory communicatively connected with the at least one processor, where the memory stores instructions executable by the at least one processor, and when executed by the at least one processor, the instructions cause the at least one processor to perform the method for obtaining the angle of departure (AOD) of the terminal according to the first aspect of the disclosure, or the method for obtaining the angle of departure (AOD) of the terminal according to the second aspect of the disclosure, or the method for obtaining the angle of departure (AOD) of the terminal according to the third aspect of the disclosure, or the method for obtaining the angle of departure (AOD) of the terminal according to the fourth aspect of the disclosure.

In the tenth aspect of the disclosure, the examples provide a computer storage medium storing computer-executable instructions, where after the computer-executable instructions are executed by a processor, the method for obtaining the angle of departure (AOD) of the terminal according to the first aspect of the disclosure, or the method for obtaining the angle of departure (AOD) of the terminal according to the second aspect of the disclosure, or the method for obtaining the angle of departure (AOD) of the terminal according to the third aspect of the disclosure, or the method for obtaining the angle of departure (AOD) of the terminal according to the fourth aspect of the disclosure can be implemented.

What is claimed is:

1. A method for obtaining an angle of departure (AOD) of a terminal, performed by a sending terminal, comprising:

sending angle measuring signals to a receiving terminal at a plurality of sending positions;

receiving phase information, sent by the receiving terminal, of the angle measuring signals corresponding to the plurality of sending positions; and obtaining, according to the phase information of the angle measuring signals, the AOD of the sending terminal;

wherein sending the angle measuring signals to the receiving terminal at the plurality of sending positions comprises:

sending the angle measuring signals with same antenna at the plurality of sending positions; or sending angle measuring signals with same antenna at some of the plurality of sending positions, and sending angle measuring signals with different antennas at the other sending positions;

wherein before sending the angle measuring signals to the receiving terminal at the plurality of sending positions, the method further comprises:

sending a capability negotiation request to the receiving terminal, wherein the capability negotiation request is configured to negotiate whether the receiving terminal supports AOD measurement based on a phase; and receiving a capability negotiation request response sent by the receiving terminal, wherein the capability negotiation request response is configured to indicate whether the receiving terminal supports the AOD measurement based on the phase;

wherein the capability negotiation request is sent or the capability negotiation request response is received through a terminal capability enquiry sidelink or a terminal capability information sidelink.

2. The method for obtaining the angle of departure (AOD) of the terminal according to claim 1, wherein sending the angle measuring signals to the receiving terminal at the plurality of sending positions comprises:

sending the angle measuring signals to the receiving terminal for a plurality of times at the plurality of sending positions.

3. The method for obtaining the angle of departure (AOD) of the terminal according to claim 2, wherein sending the angle measuring signals to the receiving terminal for the plurality of times at the plurality of sending positions comprises:

sending the angle measuring signals to the receiving terminal according to preset sending times corresponding to the plurality of sending positions; or periodically sending the angle measuring signals to the receiving terminal at the plurality of sending positions.

4. The method for obtaining the angle of departure (AOD) of the terminal according to claim 1, wherein before sending the angle measuring signals to the receiving terminal at the plurality of sending positions, the method further comprises:

negotiating an angle measuring parameter of the AOD with the receiving terminal using one of the following modes:

sending an angle measuring request to the receiving terminal, wherein the angle measuring request carries the angle measuring parameter; or receiving an angle measuring request response sent by the receiving terminal, wherein the angle measuring request response carries the angle measuring parameter; or sending resource scheduling information to the receiving terminal, wherein the resource scheduling information comprises the angle measuring parameter; or sending negotiation indicating information to the receiving terminal, wherein the negotiation indicating information carries the angle measuring parameter;

wherein the angle measuring parameter comprises at least one of: a sending period, one or more sending times, a sending duration per sending for the angle measuring signals, a sending period for the phase information of the angle measuring signals, an angle measuring type or an angle measuring period of triggering angle measurement;

wherein before sending the angle measuring signals to the receiving terminal at the plurality of sending positions, the method further comprises:

configuring the angle measuring signals according to the angle measuring parameter.

5. A communication device, comprising:

at least one processor; and a memory communicatively connected to the at least one processor, wherein the memory stores instructions executable by the at least one processor, and when executed by the at least one processor, the instructions cause the at least one processor to perform the method according to claim 1.

6. A method for obtaining an angle of departure (AOD) of a terminal, performed by a receiving terminal, comprising:

receiving angle measuring signals sent by a sending terminal at a plurality of sending positions;

obtaining phase information of the angle measuring signals corresponding to the plurality of sending positions; and sending the phase information of the angle measuring signals to the sending terminal;

wherein the angle measuring signals comprise:

angle measuring signals sent by the sending terminal at the plurality of sending positions with same antenna; or angle measuring signals sent by the sending terminal at some of the plurality of sending positions with same antenna, and angle measuring signals sent by the sending terminal at the other sending positions with different antennas;

wherein before receiving the angle measuring signals sent by the receiving terminal at the plurality of sending positions, the method further comprises:

receiving a capability negotiation request sent by the sending terminal, wherein the capability negotiation request is configured to negotiate whether the receiving terminal supports AOD measurement based on the phase information; and sending a capability negotiation request response to the sending terminal, wherein the capability negotiation request response is configured to indicate whether the receiving terminal supports AOD measurement based on the phase information;

wherein the capability negotiation request is received or the capability negotiation request response is sent through a terminal capability enquiry sidelink or a terminal capability information sidelink.

7. The method for obtaining the angle of departure (AOD) of the terminal according to claim 6, wherein receiving the angle measuring signals sent by the receiving terminal at the plurality of sending positions comprises:

receiving the angle measuring signals sent by the sending terminal for a plurality of times at the plurality of sending positions.

8. The method for obtaining the angle of departure (AOD) of the terminal according to claim 6, wherein sending the phase information of the angle measuring signals to the sending terminal comprises:

sending, in response to reaching into a sending period of the phase information of the angle measuring signals each time, the phase information of the angle measuring signals to the sending terminal.

9. The method for obtaining the angle of departure (AOD) of the terminal according to claim 6, wherein after obtaining the phase information of the angle measuring signals corresponding to the plurality of sending positions, the method further comprises:

obtaining two sending times corresponding to two angle measuring signals at adjacent sending positions, and modifying the phase information of the angle measuring signals based on a difference between the two sending times.

10. The method for obtaining the angle of departure (AOD) of the terminal according to claim 6, wherein before receiving the angle measuring signals sent by the receiving terminal at the plurality of sending positions, the method further comprises:

negotiating an angle measuring parameter of the AOD with the sending terminal using one of the following negotiation modes:

receiving an angle measuring request sent by the sending terminal, wherein the angle measuring request carries the angle measuring parameter; or sending an angle measuring request response to the sending terminal, wherein the angle measuring request response carries the angle measuring parameter; or receiving resource scheduling information sent by the sending terminal, wherein the resource scheduling information comprises the angle measuring parameter; or receiving negotiation indicating information sent by the sending terminal, wherein the negotiation indicating information carries the angle measuring parameter;

wherein the angle measuring parameter comprises at least one of: a sending period, one or more sending times, a sending duration per sending for the angle measuring signals, a sending period for the phase information of the angle measuring signals, an angle measuring type or an angle measuring period of triggering angle measurement.

11. A communication device, comprising:

at least one processor; and a memory communicatively connected to the at least one processor, wherein the memory stores instructions executable by the at least one processor, and when executed by the at least one processor, the instructions cause the at least one processor to perform the method according to claim 6.

12. A method for obtaining an angle of departure (AOD) of a terminal, performed by a receiving terminal, comprising:

receiving angle measuring signals sent by a sending terminal at a plurality of sending positions;

obtaining phase information of the angle measuring signals corresponding to the plurality of sending positions; and obtaining, according to the phase information of the angle measuring signals, the AOD of the sending terminal, and sending the AOD to the sending terminal;

wherein the angle measuring signals comprise:

angle measuring signals sent by the sending terminal at the plurality of sending positions with same antenna; or angle measuring signals sent by the sending terminal at some of the plurality of sending positions with same antenna, and angle measuring signals sent by the sending terminal at the other sending positions with different antennas;

wherein before receiving angle measuring signals sent by the receiving terminal at the plurality of sending positions, the method further-comprises:

receiving a capability negotiation request sent by the sending terminal, wherein the capability negotiation request is configured to negotiate whether the receiving terminal supports AOD measurement based on the phase information; and sending a capability negotiation request response to the sending terminal, wherein the capability negotiation request response is configured to indicate whether the receiving terminal supports the AOD measurement based on the phase information;

wherein the capability negotiation request is received or the capability negotiation request response is sent through a terminal capability enquiry sidelink or a terminal capability information sidelink.

13. The method for obtaining the angle of departure (AOD) of the terminal according to claim 12, wherein sending times of the angle measuring signals are configured as a plurality of groups, and obtaining the AOD of the sending terminal according to the phase information of the angle measuring signals comprises:

obtaining, for any group, by performing an AOD calculation based on an antenna spacing configured for the group and the phase information of the angle measuring signals corresponding to the group, the AOD of the sending terminal corresponding to the group.

14. The method for obtaining the angle of departure (AOD) of the terminal according to claim 13, wherein each group is configured with repeated sending times, and obtaining the AOD of the sending terminal according to the phase information of the angle measuring signals comprises:

obtaining, for any group, by performing the AOD calculation based on the antenna spacing configured for the group and corresponding phase information of the angle measuring signals, obtained each repetition, of the group, a plurality of AODs corresponding to the group; and obtaining an average value of the plurality of AODs corresponding to the group as an AOD, corresponding to the group, of the sending terminal.

15. The method for obtaining the angle of departure (AOD) of the terminal according to claim 12, further comprising:

sending, in response to reaching into a sending period of the AOD each time, the AOD to the sending terminal;

wherein obtaining the phase information of the angle measuring signals corresponding to the plurality of sending positions comprises:

obtaining two sending times corresponding to two angle measuring signals at adjacent sending positions, and modifying the phase information of the angle measuring signals based on a difference between the two sending times.

16. The method for obtaining the angle of departure (AOD) of the terminal according to claim 12, wherein before the receiving angle measuring signals sent by the receiving terminal at the plurality of sending positions, the method further comprises:

negotiating an angle measuring parameter of the AOD with the sending terminal using one of the following negotiation modes:

receiving an angle measuring request sent by the sending terminal, wherein the angle measuring request carries the angle measuring parameter; or sending an angle measuring request response to the sending terminal, wherein the angle measuring request response carries the angle measuring parameter; or receiving resource scheduling information sent by the sending terminal, wherein the resource scheduling information comprises the angle measuring parameter; or receiving negotiation indicating information sent by the sending terminal, wherein the negotiation indicating information carries the angle measuring parameter, wherein the angle measuring parameter at least comprises: an antenna spacing configured by the sending terminal;

wherein the angle measuring parameter further comprises at least one of: a sending period, one or more sending times, a sending duration per sending for the angle measuring signals, a sending period for the phase information of the angle measuring signals, an angle measuring type or an angle measuring period of triggering angle measurement.

17. A communication device, comprising:

at least one processor; and a memory communicatively connected to the at least one processor, wherein the memory stores instructions executable by the at least one processor, and when executed by the at least one processor, the instructions cause the at least one processor to perform the method according to claim 12.

\* \* \* \* \*